United States Patent
Harpal et al.

(10) Patent No.: US 10,533,521 B2
(45) Date of Patent: Jan. 14, 2020

(54) INFLATABLE CASCADE ASSEMBLY, SYSTEM, AND METHOD FOR A CASCADE THRUST REVERSER SYSTEM

(71) Applicant: The Boeing Company, Chicago, IL (US)

(72) Inventors: Naimishkumar B. Harpal, Everett, WA (US); Chen Chuck, Mercer Island, WA (US); Zachariah B. Vandemark, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 346 days.

(21) Appl. No.: 15/665,362

(22) Filed: Jul. 31, 2017

(65) Prior Publication Data
US 2019/0032601 A1   Jan. 31, 2019

(51) Int. Cl.
*F02K 1/76* (2006.01)
*F02K 1/72* (2006.01)
*F02K 1/64* (2006.01)

(52) U.S. Cl.
CPC ............... *F02K 1/763* (2013.01); *F02K 1/72* (2013.01); *F02K 1/645* (2013.01); *F05D 2220/323* (2013.01); *F05D 2230/60* (2013.01); *F05D 2240/129* (2013.01); *F05D 2260/606* (2013.01); *F05D 2270/65* (2013.01)

(58) Field of Classification Search
CPC ... F02K 1/763; F02K 1/72; F02K 1/70; F02K 1/62; F02K 1/625
See application file for complete search history.

(56) References Cited

U.S. PATENT DOCUMENTS

| | | | | |
|---|---|---|---|---|
| 4,731,991 | A | * | 3/1988 | Newton ............... F02K 1/72 |
| | | | | 239/265.31 |
| 2014/0117106 | A1 | | 5/2014 | Acheson et al. |
| 2017/0152811 | A1 | | 6/2017 | Acheson et al. |

FOREIGN PATENT DOCUMENTS

GB           2488962       *   9/2012    ............ F02K 1/006

OTHER PUBLICATIONS

Web pages from Airborne Systems website, 2017, at web address of http://airborne-sys.com/experience/space-parachutes-inflatable-military/#experience1, 6 pages.

* cited by examiner

*Primary Examiner* — Andrew H Nguyen

(57) ABSTRACT

There is provided an inflatable cascade assembly for a cascade thrust reverser system of an engine of an air vehicle. The inflatable cascade assembly has inflatable cascade members for inflation with a pressurized fluid. The inflatable cascade members are movable between a stowed deflated state and a deployed inflated state. Each inflatable cascade member has a forward end, an aft end, and a body. The body has circumferential vanes each having a first non-inflatable rigid side attached adjacent to a second inflatable flexible side. The body further has inflatable support members that are spaced apart and longitudinally extending, and coupled in a perpendicular arrangement to the circumferential vanes. The body further has a plurality of flow openings defined between the circumferential vanes and the inflatable support members. Each inflatable cascade member further has first and second extendable side supports coupled to respective first and second side ends of the body.

20 Claims, 16 Drawing Sheets

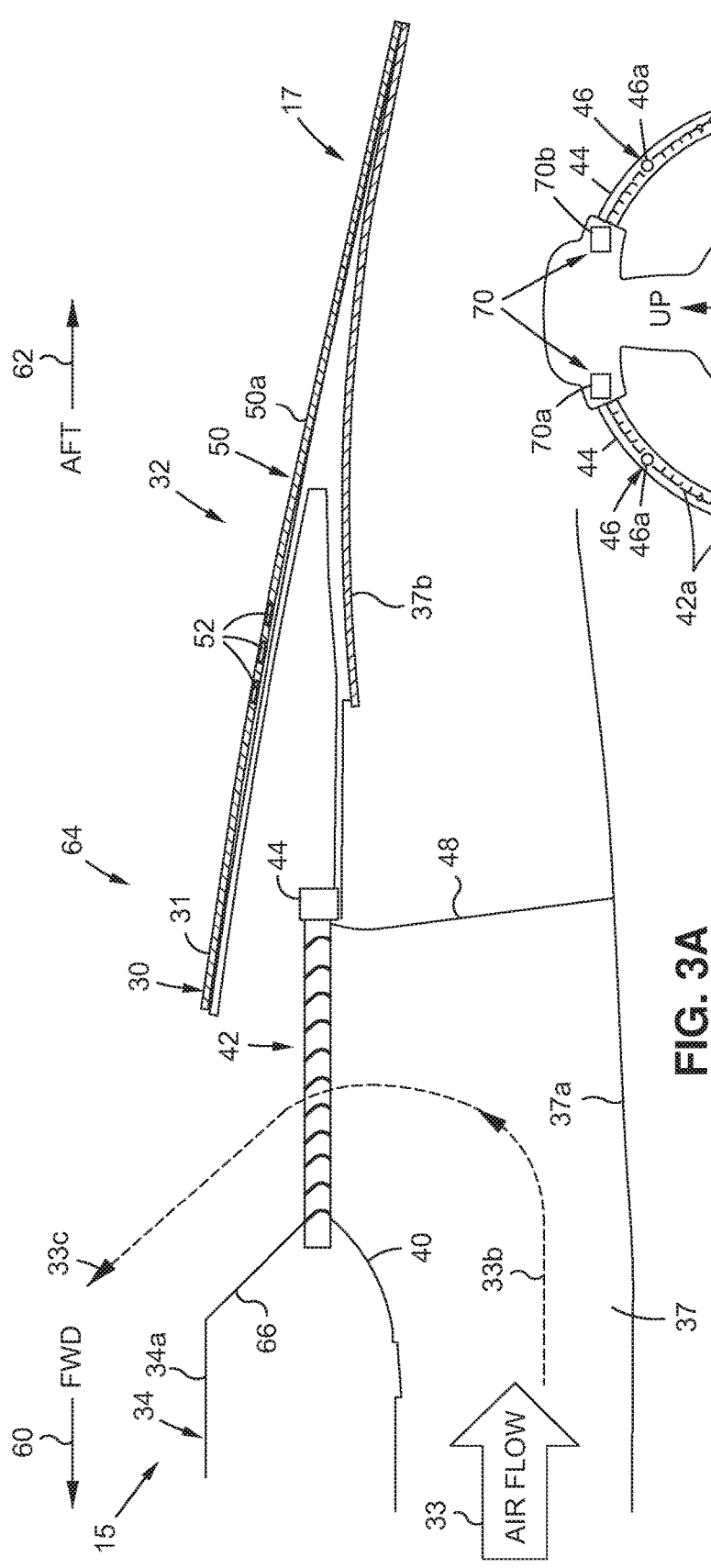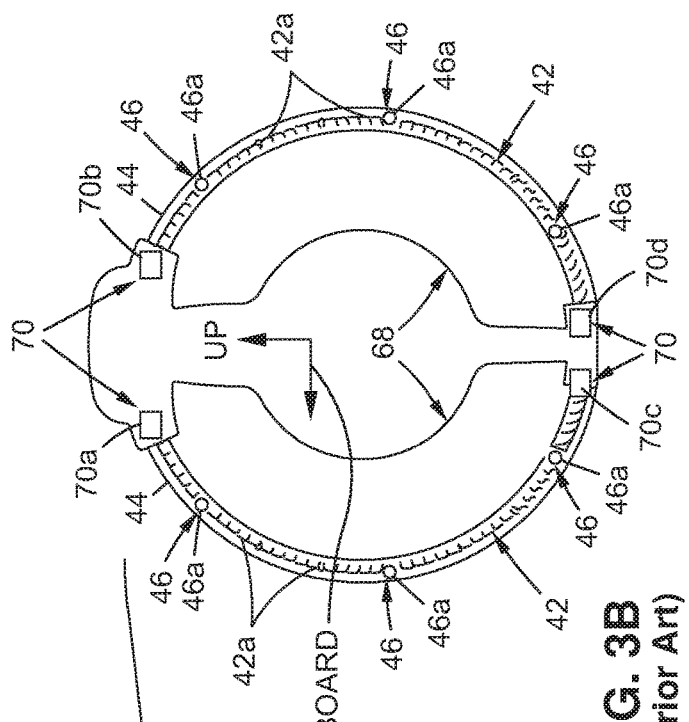
FIG. 3A (Prior Art)
FIG. 3B (Prior Art)

FIG. 4

| VEHICLE 11 | AIR VEHICLE 12 | AIRCRAFT 12a | ENGINE 16 | GAS TURBINE ENGINE 16a |

| NACELLE 14 | SHORTENED NACELLE 14a | FIXED PORTION 174 | INLET COWL 174a |
| REDUCED LENGTH TRANSLATING PORTION 170 | REDUCED LENGTH TRANSLATING SLEEVE 170a |

| CASCADE TR SYSTEM 24 | INFLATABLE CASCADE TR SYSTEM 24a | TR BULLNOSE FAIRING 40 |
| TR ACT. 177 |
| HYDRAULIC ACT. 177a | PNEUMATIC ACT. 177b | MECHANICAL ACT. 177c | ELECTRICAL ACT. 177d |
| ACT. CONTROLLER 178 | ACT. POWER SOURCE 179 | AIR FLOW 33 | SAFETY DEVICE(S) 190 | PRESSURE SENSOR(S) 190a |
| AIR LEAKAGE 191a | CASCADE BREACH 191b | UNWANTED INFLATION 191c |
| CASCADE THRUST REVERSER 176 | INFLATABLE CASCADE THRUST REVERSER 176a |
| STOWED FORWARD THRUST MODE 181 | DEPLOYED REVERSE THRUST MODE 186 |

INFLATABLE CASCADE SYSTEM 10

| INFLATABLE CASCADE ASSEMBLY 80 | INFLATABLE CASCADE MEMBERS 82 |
| STOWED DEFLATED STATE 84 | STOWED LENGTH 85 |
| DEPLOYED INFLATED STATE 76 | DEPLOYED LENGTH 87 |
| FORWARD END 88a | AFT END 88b | BODY 90 | FIRST SIDE ENDS 116a | SECOND SIDE ENDS 116b |
| CIRCUMFERENTIAL VANES 92 | FIRST NON-INFLATABLE RIGID SIDE 94 | THICKNESS 98 |
| SECOND INFLATABLE FLEXIBLE SIDE 96 | THICKNESS 100 | FLEXIBLE MATERIAL 112 |

| INFLATABLE SUPPORT MEMBERS 102 | INFLATABLE STRONGBACKS 102a |
| STOWED DEFLATED POSITION 108 | DEPLOYED INFLATED POSITION 110 | FLOW OPENINGS 106 |
| EXTENDABLE SIDE SUPPORT 118 | FIRST EXTEND. SIDE SUPPORT 118a | SECOND EXTEND. SIDE SUPPORT 118b |

| PLENUM CHAMBER 136 | ORIFICE PLATE PORTION 138 | FORWARD FLOW VALVE 150 |
| AFT FLOW VALVE 160 | ELEC. FLOW CONTROL VALVES 150a, 160a |

| PRESSURIZED FLUID SUPPLY SYSTEM 122 | PRESSURIZED AIR SUPPLY SYSTEM 122a |
| ENGINE COMP. BLEED AIR SUPPLY SYS. 122b | RAM AIR SUPPLY SYS. 122e |
| COMPRESSED AIR SUPPLY SYS. 122c | COMP. AIR BOTTLES 122d | HYDRAULIC FLUID SYS. 26 |

| PRESSURIZED FLUID 120 | PRESSURIZED AIR 120a | ENGINE COMPRESSOR BLEED AIR 120b |
| COMPRESSED AIR 120c | HYDRAULIC FLUID 120d | RAM AIR 120e |

| TRANSLATING AFT CASCADE SUPPORT RING 140 | TRANSLATING APP. 148 | SLIDER APP. 148a |
| RECTANGULAR CONFIG. 140a | C-SHAPED CONFIG. 140b | Z-SHAPED CONFIG. 140c | I-SHAPED CONFIG. 140d |

| REDUCED AERODYNAMIC DRAG 274 | REDUCED NACELLE EXTERNAL DRAG 275 |
| INCREASED FAN DUCT EFFICIENCY 276 | INCREASED FAN NOZZLE EFFICIENCY 277 |
| REDUCED WEIGHT 278 | REDUCED LENGTH 279 |

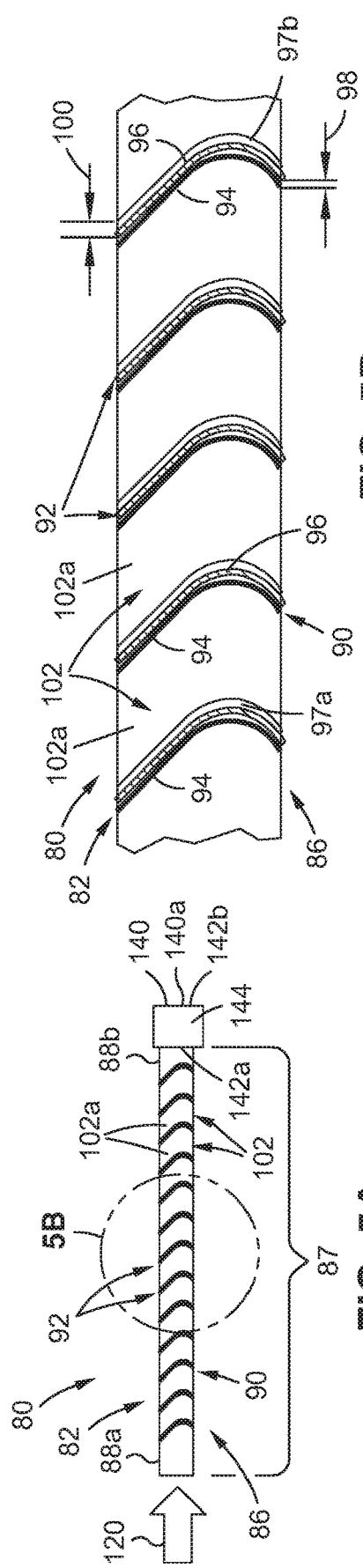
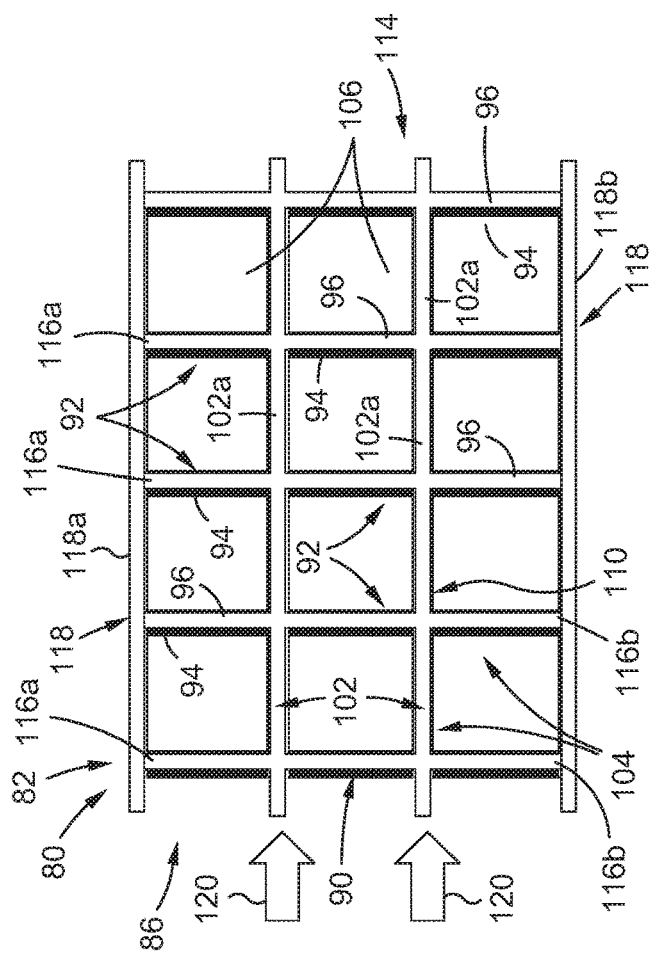
FIG. 5B
FIG. 5C
FIG. 5A

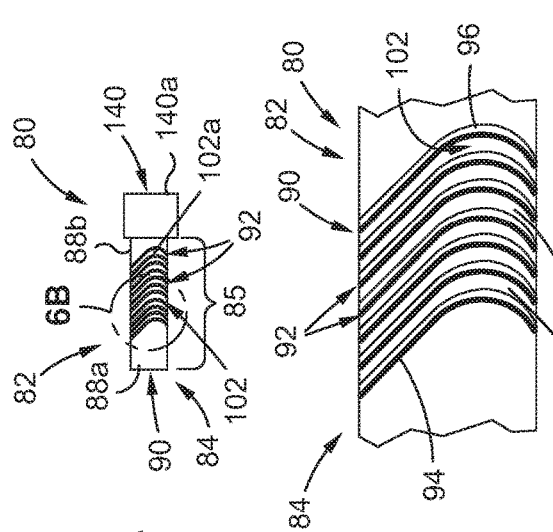
FIG. 6A
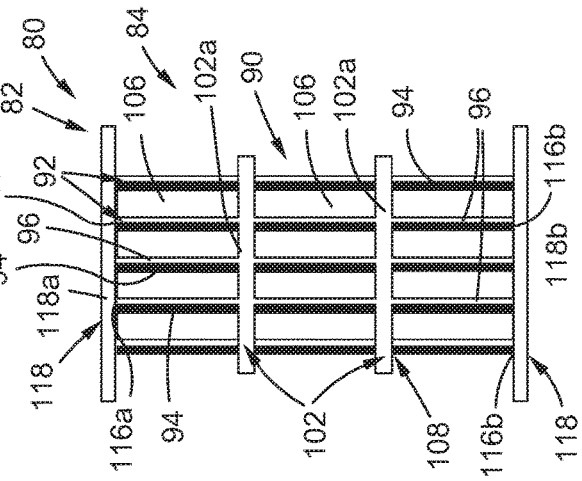
FIG. 6B
FIG. 6C
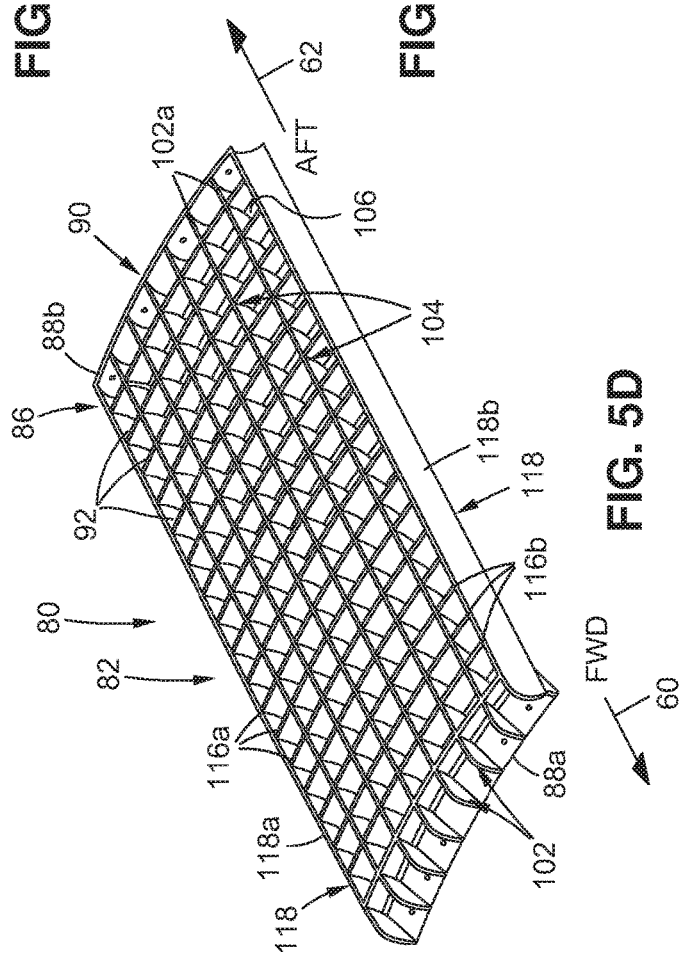
FIG. 5D

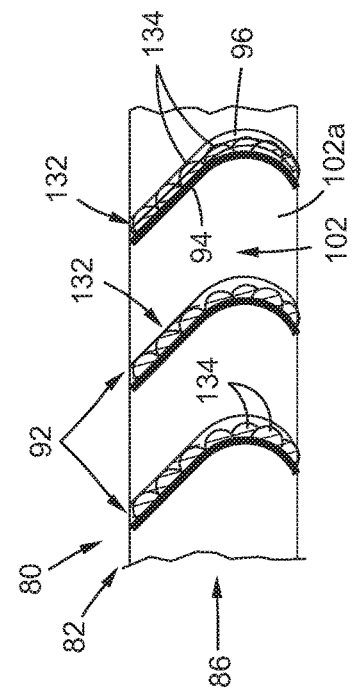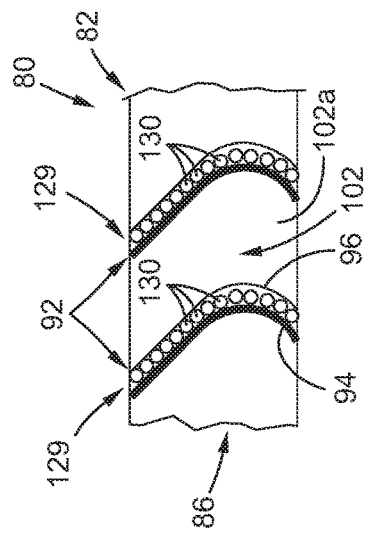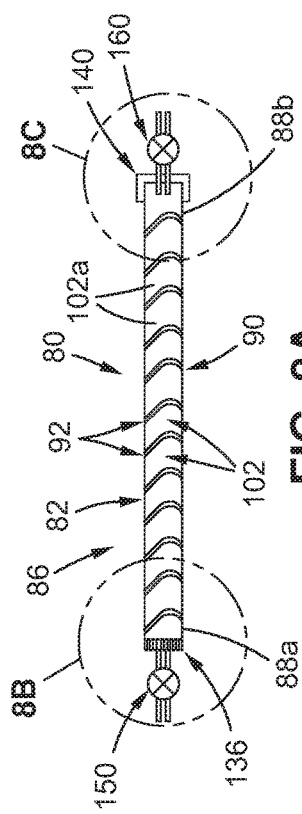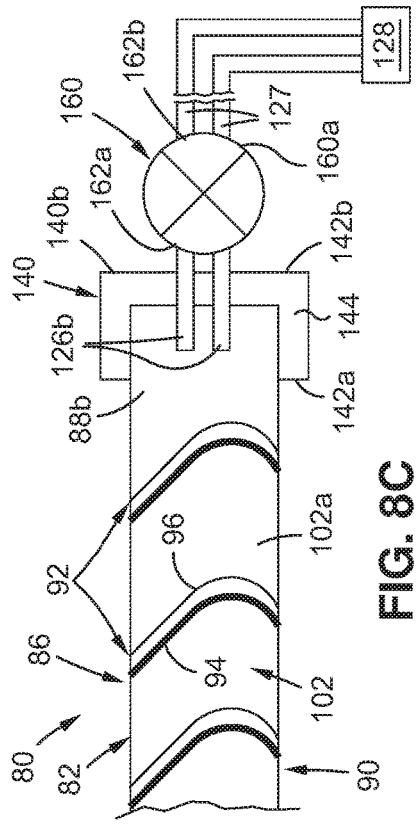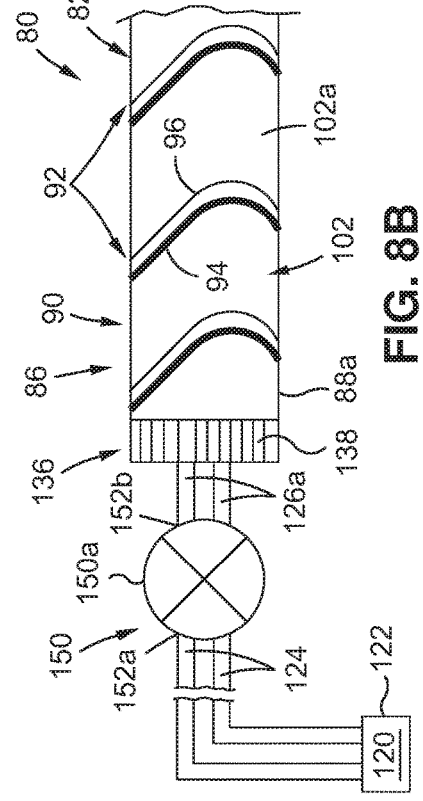

INFLATABLE CASCADE ASSEMBLY, SYSTEM, AND METHOD FOR A CASCADE THRUST REVERSER SYSTEM

BACKGROUND

1) Field of the Disclosure

The disclosure relates generally to thrust reverser assemblies, systems, and methods for air vehicle engines, and more particularly, to cascade thrust reverser assemblies, systems, and methods for aircraft gas turbine engines.

2) Description of Related Art

Vehicles, such as commercial and military jet aircraft, use thrust reverser assemblies and systems on the aircraft's jet engines, such as gas turbine engines, to block forward thrust or redirect the forward thrust into a reverse thrust, in order to reduce the aircraft's speed just after landing, to reduce wear on the aircraft's brakes, and to enable shorter landing distances.

One type of thrust reverser assembly or system used on large jet engines on aircraft includes a cascade thrust reverser assembly or system having an engine nacelle with a fixed forward portion, and a translating sleeve aft portion, that when translated in an aft direction, reveals individual cascade assemblies that are fixed in place and made of a solid material, such as composites or metal. There are typically 16 (sixteen) cascade assemblies per jet engine, and each cascade assembly has multiple angled vanes that enable, during a landing operation, redirecting an engine fan forward air flow in reverse and side directions to shape reverse efflux air flow and create reverse thrust to enable aerodynamic breaking.

However, known composite or metal solid cascade thrust reverser assemblies and systems may penalize the engine nacelle package, as the solid composite or metal material making up such known composite or metal solid cascade thrust reverser assemblies and systems may be heavy in weight, which may increase the aerodynamic drag and may increase the weight of the aircraft. Such increased weight of the aircraft, may, in turn, increase the fuel costs to operate the aircraft.

In addition, such known composite or metal solid cascade thrust reverser assemblies and systems may, during a forward thrust mode, e.g., a stowed position, limit hard-point constraints to design a shorter or more compact nacelle package. For example, during an aircraft's nacelle package product development design, thrust reverser cascade placement and positioning within the engine may be limited by its surrounding hard-point constraints, for example, an aft cascade support ring which is typically fixed and not movable or translatable, and external nacelle and fan duct outer wall aerodynamic lines. With such hard-point constraints from the aft cascade support ring and the external nacelle and fan duct outer wall aerodynamic lines, the design of such known composite or metal solid cascade thrust reverser assemblies and systems may be limited to maximize the nacelle performance. This, in turn, may limit fan nozzle performance and efficiency, as well as fan duct efficiency.

Moreover, the shape and the length of the 16 (sixteen) cascade assemblies and the multiple angled vanes of such known composite or metal solid cascade thrust reverser assemblies may limit designing a compact engine nacelle configuration or package. For example, known composite or metal solid cascade thrust reverser assemblies may have a length (forward-aft) of about 20 (twenty) inches long to about 30-35 (thirty to thirty-five) inches long. Such long lengths may limit designing a compact engine nacelle configuration or package, which, in turn, may limit the efficiency and performance of the jet engines.

Accordingly, there is a continuing need for an improved cascade thrust reverser assembly, system, and method for aircraft engines to reduce aerodynamic drag, to increase fan nozzle efficiency, to increase fan duct efficiency, to reduce the weight and the length of the nacelle of the engine, to increase the efficiency and performance of the jet engines, and to provide advantages over known assemblies, systems, and methods.

SUMMARY

This need for an improved cascade thrust reverser assembly, system, and method for aircraft engines is satisfied. As discussed in the below detailed description, examples of the improved cascade thrust reverser assembly, system, and method for aircraft engines may provide significant advantages over existing assemblies, systems and methods.

In a disclosed example, there is provided an inflatable cascade assembly for a cascade thrust reverser system of an engine of an air vehicle. The inflatable cascade assembly comprises a plurality of inflatable cascade members configured for inflation with a pressurized fluid. The plurality of inflatable cascade members is movable between a stowed deflated state and a deployed inflated state.

Each inflatable cascade member comprises a forward end, an aft end, and a body formed between the forward end and the aft end. The body comprises a plurality of circumferential vanes that are spaced apart and laterally extending. Each circumferential vane comprises a first non-inflatable rigid side attached adjacent to a second inflatable flexible side.

The body further comprises a plurality of inflatable support members that are spaced apart and longitudinally extending. The plurality of inflatable support members is coupled in a perpendicular arrangement to the plurality of circumferential vanes. The body further comprises a plurality of flow openings defined between the plurality of circumferential vanes and the plurality of inflatable support members.

Each inflatable cascade member further comprises a first extendable side support coupled to first ends side of the body. Each inflatable cascade member further comprises a second extendable side support coupled to second side ends of the body. The first extendable side support and the second extendable side support are positioned parallel to the plurality of inflatable support members.

In another disclosed example, there is provided an inflatable cascade system for a cascade thrust reverser system of an engine of an air vehicle. The inflatable cascade system comprises an inflatable cascade assembly coupled to a fixed portion of a nacelle of the engine. The inflatable cascade assembly comprises a plurality of inflatable cascade members movable between a stowed deflated state, when the cascade thrust reverser system is in a stowed forward thrust mode, and a deployed inflated state, when the cascade thrust reverser system is in a deployed reverse thrust mode. Each inflatable cascade member comprises a forward end, an aft end, and a body formed between the forward end and the aft end.

The inflatable cascade system further comprises a forward flow valve coupled to the forward end. The inflatable cascade system further comprises a pressurized fluid supply system coupled to the forward flow valve. The pressurized fluid supply system provides pressurized fluid to the plurality of inflatable cascade members, via the forward flow valve, to inflate the plurality of inflatable cascade members.

The inflatable cascade system further comprises a translating aft cascade support ring coupled at the aft end. The inflatable cascade system further comprises an aft flow valve coupled to the aft end.

In another disclosed example, there is provided a method of using an inflatable cascade system for a cascade thrust reverser system in an engine of an air vehicle, to provide a reduced aerodynamic drag of the engine, and to provide an increased fan nozzle efficiency of the engine. The method comprises the step of installing an inflatable cascade system for a cascade thrust reverser system, in the engine of the air vehicle.

The inflatable cascade system comprises an inflatable cascade assembly coupled to a fixed portion of a nacelle of the engine. The inflatable cascade assembly comprises a plurality of inflatable cascade members movable between a stowed deflated state, when the cascade thrust reverser system is in a stowed forward thrust mode, and a deployed inflated state, when the cascade thrust reverser system is in a deployed reverse thrust mode. Each inflatable cascade member comprises a forward end, an aft end, and a body formed between the forward end and the aft end.

The inflatable cascade system further comprises a forward flow valve coupled to the forward end. The inflatable cascade system further comprises a pressurized fluid supply system coupled to the forward flow valve. The pressurized fluid supply system has a pressurized fluid. The inflatable cascade system further comprises a translating aft cascade support ring coupled at the aft end. The inflatable cascade system further comprises an aft flow valve coupled to the aft end. The inflatable cascade system provides the reduced aerodynamic drag of the engine, and provides the increased fan nozzle efficiency of the engine.

The method further comprises the step of, upon landing of the air vehicle, concurrently deploying from the stowed forward thrust mode, the translating aft cascade support ring, and a reduced length translating sleeve and one or more blocker doors, of the cascade thrust reverser system. The method further comprises the step of opening the forward flow valve, and fully inflating the plurality of inflatable cascade members with the pressurized fluid from the pressurized fluid supply system, to form a trapped fluid in the plurality of inflatable cascade members, and to move the plurality of inflatable cascade members from the stowed deflated state to the deployed inflated state.

The method further comprises redirecting a fan air flow with the fully inflated plurality of inflatable cascade members and with the one or more deployed blocker doors, to generate the deployed reverse thrust mode of the cascade thrust reverser system. The method further comprises the step of closing the forward flow valve, and opening the aft flow valve to release the trapped fluid from the fully inflated plurality of inflatable cascade members, out through one or more pressure relief vents in the reduced length translating sleeve, and to move the plurality of inflatable cascade members from the deployed inflated state back to the stowed deflated state. The method further comprises the step of moving concurrently the translating aft cascade support ring, and the reduced length translating sleeve and the one or more blocker doors, from the deployed reverse thrust mode back to the stowed forward thrust mode, and closing the aft flow valve.

The features, functions, and advantages that have been discussed can be achieved independently in various examples of the disclosure or may be combined in yet other examples further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary examples, but which are not necessarily drawn to scale, wherein:

FIG. 3A is an illustration of a partial sectional side view of the known cascade-type thrust reverser system of FIG. 2, in a deployed thrust reversing position;

FIG. 3B is an illustration of a front cross-sectional view of a known cascade assembly of FIG. 2, coupled to an aft cascade support ring;

FIG. 4 is an illustration of a functional block diagram showing a disclosed example of an air vehicle having disclosed examples of an inflatable cascade system for a cascade thrust reverser system;

FIG. 5A is an illustration of a side view of a disclosed example of an inflatable cascade assembly in a deployed inflated state, coupled to a translating aft cascade support ring;

FIG. 5B is an illustration of a close-up side view of the inflatable cascade assembly shown in circle 5B of FIG. 5A;

FIG. 5C is an illustration of a close-up top view of the inflatable cascade assembly of FIG. 5B;

FIG. 5D is an illustration of a side perspective view of a disclosed example of an inflatable cascade assembly;

FIG. 6A is an illustration of a side view of the inflatable cascade assembly of FIG. 5A in a stowed deflated state, coupled to a translating aft cascade support ring;

FIG. 6B is an illustration of a close-up side view of the inflatable cascade assembly shown in circle 6B of FIG. 6A;

FIG. 6C is an illustration of a close-up top view of the inflatable cascade assembly of FIG. 6B;

FIG. 7A is an illustration of a close-up side view of another disclosed example of an inflatable cascade assembly in a deployed inflated state, where a second inflatable flexible side has a tube configuration;

FIG. 7B is an illustration of a close-up side view of yet another disclosed example of an inflatable cascade assembly in a deployed inflated state, where a second inflatable flexible side has a segmented configuration;

FIG. 8A is an illustration of a side view of a disclosed example of an inflatable cascade assembly in a deployed inflated state having a plenum chamber and a forward flow valve at a forward end, and having a translating aft cascade support ring and an aft flow valve at an aft end;

FIG. 8B is an illustration of a close-up side view of the inflatable cascade assembly, the plenum chamber, and the forward flow valve, shown in circle 8B of FIG. 8A, where the inflatable cascade assembly is coupled to a pressurized fluid supply system via the forward flow valve;

FIG. 8C is an illustration of a close-up side view of the inflatable cascade assembly, the translating aft cascade support ring, and the aft flow valve, shown in circle 8C of FIG. 8A, where the inflatable cascade assembly is coupled to a plurality of pressure relief vents via the aft flow valve;

DETAILED DESCRIPTION

Disclosed examples will now be described more fully hereinafter with reference to the accompanying drawings, in which some, but not all of the disclosed examples are shown. Indeed, several different examples may be provided and should not be construed as limited to the examples set forth herein. Rather, these examples are provided so that this disclosure will be thorough and complete and will fully convey the scope of the disclosure to those skilled in the art.

Figure 1:
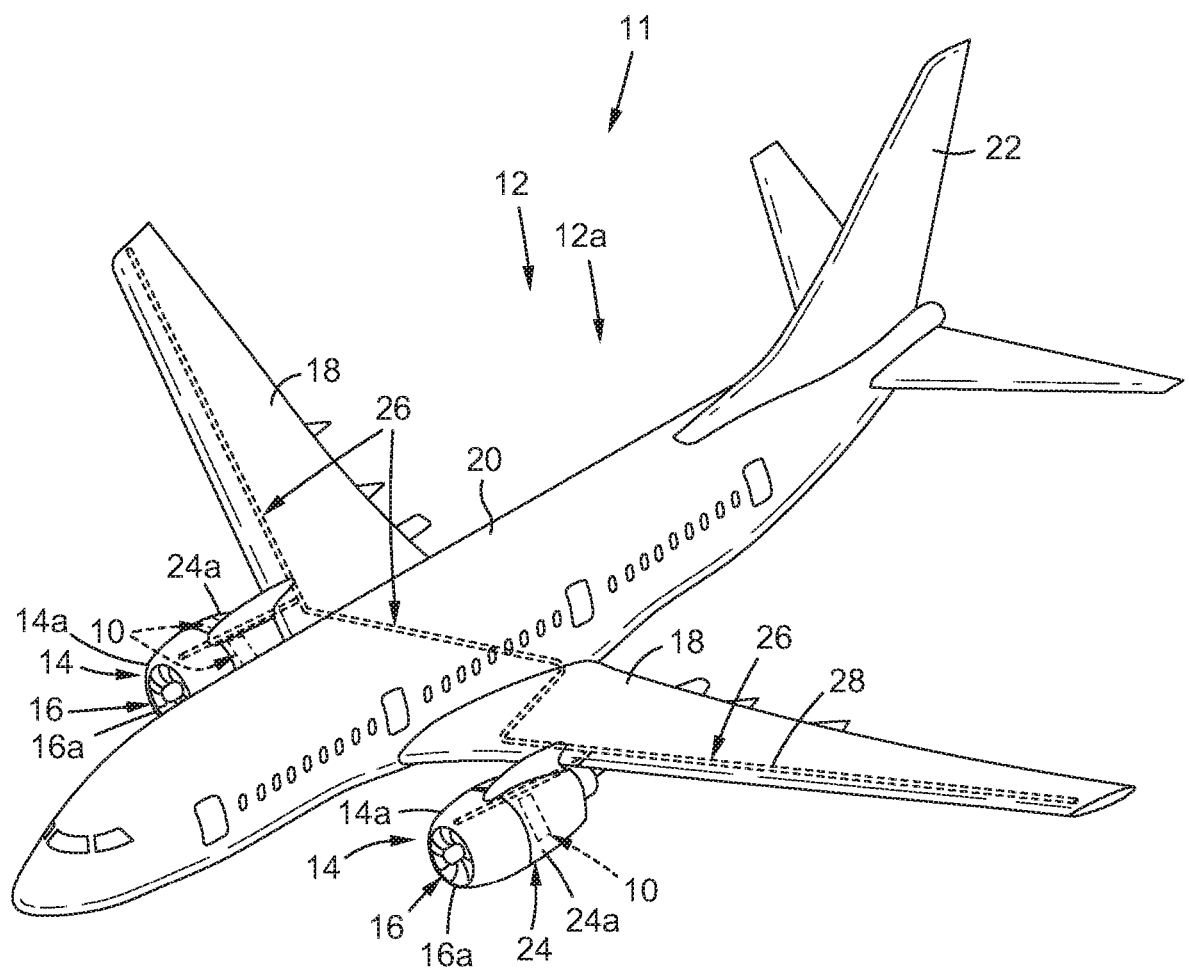
FIG. 1 is an illustration of a perspective view of a vehicle, such as an air vehicle, that may incorporate a disclosed example of an inflatable cascade system for a cascade thrust reverser system.

Now referring to the Figures, FIG. 1 is an illustration of a perspective view of a vehicle 11, such as an air vehicle 12, for example, an aircraft 12a, that may incorporate a disclosed example of an inflatable cascade system 10 for a cascade thrust reverser system 24, such as in the form of an inflatable cascade thrust reverser system 24a. As shown in FIG. 1, the vehicle 11, such as the air vehicle 12, for example, the aircraft 12a, comprises two nacelles 14 which shroud or surround two engines 16, respectively, for example, gas turbine engines 16a, or turbofan engines. The vehicle 11 (see FIG. 1), such as the air vehicle 12 (see FIG. 1), for example, the aircraft 12a (see FIG. 1), further comprises wings 18 (see FIG. 1), a fuselage 20 (see FIG. 1), and a tail 22 (see FIG. 1). As shown in FIG. 1, each engine 16 and nacelle 14 includes the inflatable cascade system 10 for the cascade thrust reverser system 24, such as in the form of inflatable cascade thrust reverser system 24a. As further shown in FIG. 1, the vehicle 11, such as the air vehicle 12, for example, the aircraft 12a, may include a hydraulic fluid system 26 having hydraulic fluid distribution elements 28, such as in the form of ducting, tubing, or other suitable distribution elements, that may be incorporated throughout portions in the wings 18 and engines 16.

As used herein, "cascade thrust reverser system" and "cascade thrust reverser" mean a system configured to reverse or divert an aircraft engine's thrust, so that it is directed in a forward direction 60 (see FIG. 9C), rather than in an aft direction 62 (see FIG. 9C), and that uses a plurality of cascade members, such as inflatable cascade members 82 (see FIGS. 9A-9D) and blocker doors 48 (see FIGS. 9A-9D) deployed to block the engine's direct air flow exhaust exit and redirect or deflect an air flow 33 (see FIG. 9A) through the plurality of cascade members, such as the inflatable cascade members 82 (see FIGS. 9A-9D) so as to create a thrust reversal. The cascade thrust reverser system 24 (see FIG. 1) helps to slow down the vehicle 11 (see FIG. 1), such as the air vehicle 12 (see FIG. 1), for example, the aircraft 12a (see FIG. 1), upon landing or touchdown or just after landing or touchdown, helps to reduce wear on the brakes of the vehicle 11 (see FIG. 1), such as the air vehicle 12 (see FIG. 1), for example, the aircraft 12a (see FIG. 1), and helps to enable shorter landing distances for the air vehicle 12 (see FIG. 1), such as the aircraft 12a (see FIG. 1). As used herein, "landing distance" means a ground roll of the vehicle 11 (see FIG. 1), such as the air vehicle 12 (see FIG. 1), for example, the aircraft 12a (see FIG. 7), from the point of landing or touchdown to a complete stop or rest.

Figure 2:
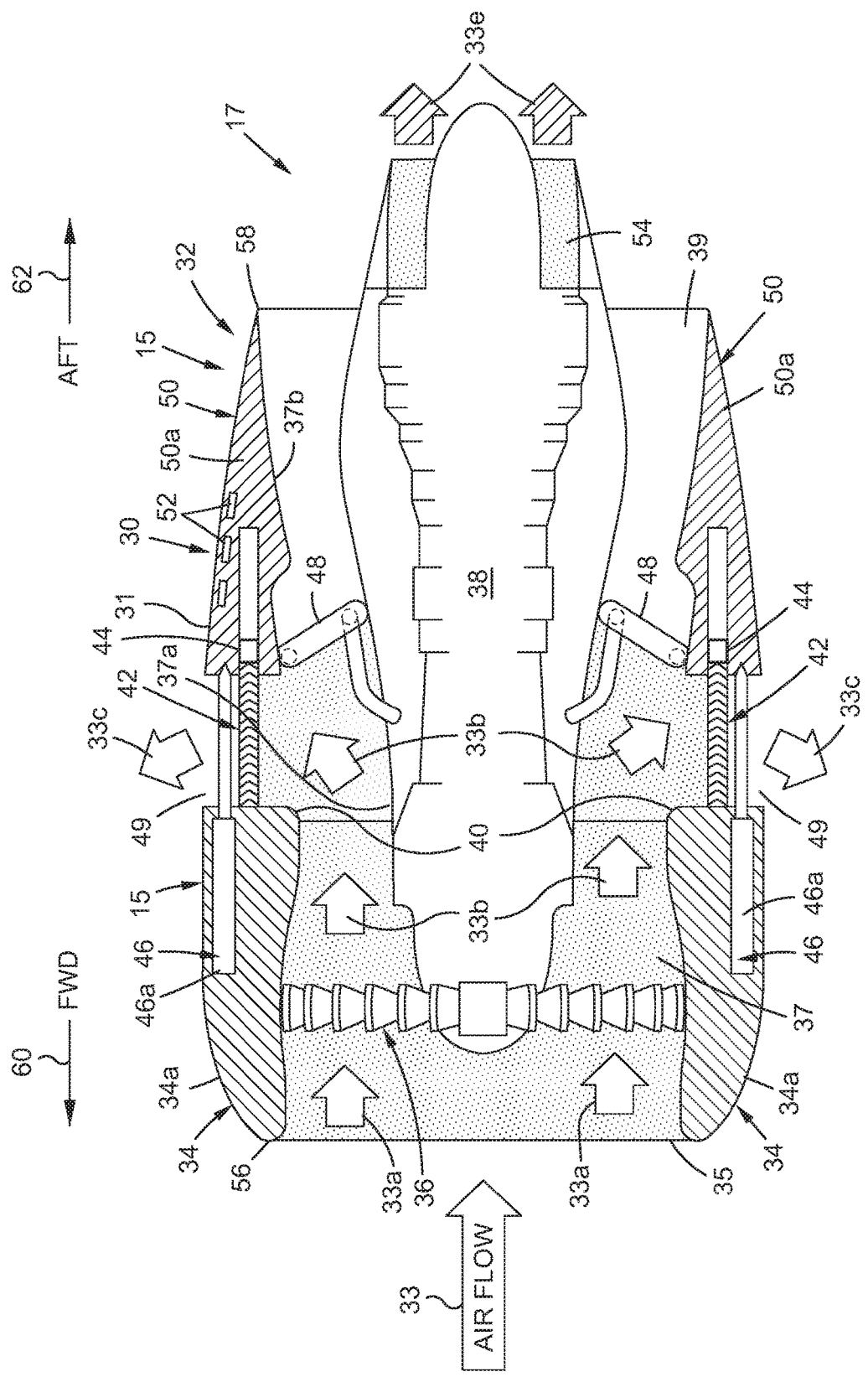
FIG. 2 is an illustration of a top sectional view of a known engine with a known cascade-type thrust reverser system.

Now referring to FIG. 2, FIG. 2 is an illustration of a top sectional view of a known engine 17 with a known cascade-type thrust reverser system 30 having a thrust reverser 31 shown in a deployed reverse thrust position 32. As shown in FIG. 2, air flow 33, such as in the form of intake air flow 33a, flows into the engine 17, which is shrouded by a known nacelle 15. The air flow 33 (see FIG. 2) flows in at an air flow inlet 35 (see FIG. 2) of a fixed portion 34 (see FIG. 2) of the nacelle 15 (see FIG. 2), such as in the form of an inlet cowl 34a (see FIG. 2). The intake air flow 33a (see FIG. 2) flows through a fan 36 (see FIG. 2) and becomes fan air flow 33b (see FIG. 2). The fan 36 (see FIG. 2) is disposed within a fan duct 37 (see FIG. 2) of the engine 17 (see FIG. 2), and the fan duct 37 terminates in a fan nozzle 39 (see FIG. 2). The fan duct 37 (see FIG. 2) includes a fan duct inner wall 37a (see FIG. 2) and a fan duct outer wall 37b (see FIG. 2). As shown in FIG. 2, in the deployed reverse thrust position 32, the fan air flow 33b flows through the fan duct 37, around the sides of an engine core 38, and around a thrust reverser bullnose fairing 40, and is blocked by blocker doors 48 that are deployed.

As further shown in FIG. 2, the fan air flow 33b flows through a known cascade assembly 42 coupled to an aft cascade support ring 44, and exits the nacelle 15, as reverse efflux air flow 33c, at an opening exit 49 of the engine 17. The known cascade assembly 42 shown in FIG. 2 is made of a solid material, for example, a metal, a composite, or a combination of a metal and a composite, and is manufactured using known processes, such as composite hand lay-up, thermoplastic molding, casting, three-dimensional printing, machining, or another suitable manufacturing process. In addition, the known cascade assembly 42, as well as the aft cascade support ring 44, shown in FIG. 2, are both fixed in position and do not move or translate, regardless of whether the thrust reverser 31 is stowed or deployed.

During thrust reversal, instead of being ejected from the rear of the engine 17 (see FIG. 2), for example, at the fan nozzle 39 (see FIG. 2) or at a core nozzle 54 (see FIG. 2), to generate forward thrust, the fan air flow 30b (see FIG. 2) is blocked by blocker doors 48 (see FIG. 2) inside the engine 17 (see FIG. 2) and directed as reverse efflux air flow 30c outside the nacelle 15 (see FIG. 2), in a generally forward direction 60 (see FIG. 2) to generate a reverse thrust.

The nacelle 15 (see FIG. 2) includes the fixed portion 34 (see FIG. 2), such as in the form of inlet cowl 34a (see FIG. 2), at a forward end 56 (see FIG. 2) of the nacelle 15 (see FIG. 2), and the nacelle 15 (see FIG. 2) further includes a translating portion 50 (see FIG. 2), such as in the form of a translating sleeve 50a (see FIG. 2), at an aft end 58 (see FIG. 2) of the nacelle 15 (see FIG. 2). The translating sleeve 50a (see FIG. 2) may include pressure relief vents 52 (see FIG. 2). As shown in FIG. 2, exhaust air flow 30e exits from the core nozzle 54 of the engine 17 at the aft end 58 of the nacelle 15.

FIG. 2 further shows thrust reverser actuators 46, such as in the form of hydraulic actuators 46a, for actuating the translating sleeve 50a in an aft direction 62. When the thrust reverser 31 (see FIG. 2) is activated, the thrust reverser actuators 46 (see FIG. 2) cause the translating sleeve 50a (see FIG. 2) to move in the aft direction 62 (see FIG. 2), uncovering the cascade assembly 42 (see FIG. 2). A linkage between the translating sleeve 50a (see FIG. 2) and the blocker doors 48 (see FIG. 2) moves the blocker doors 48 into the fan air flow 33b (see FIG. 2) stream, blocking its normal path and diverting it out through the cascade assembly 42, which redirects the fan air flow 33b in the forward direction 60 (see FIG. 2) out of the engine 17, as reverse efflux air flow 33c (see FIG. 2), to help slow down the aircraft 12a (see FIG. 1), upon landing or touchdown.

Now referring to FIG. 3A, FIG. 3A is an illustration of a partial sectional side view of the known engine 17 with the known cascade-type thrust reverser system 30 of FIG. 2, with the thrust reverser 31 in the deployed reverse thrust position 32. FIG. 3A shows the known cascade-type thrust reverser system 30 in a deployed reverse thrust mode 64. FIG. 3A further shows the air flow 33, such as the fan air flow 33b, flowing through the fan duct 37 and around the thrust reverser bullnose fairing 40, being blocked by the blocker doors 48 inside the engine 17, being directed through the cascade assembly 42, which is coupled to the aft cascade support ring 44, and being directed as reverse efflux air flow 30c outside the engine 17 and the nacelle 15, in a generally forward direction 60 to generate the reverse thrust. FIG. 3A further shows the fan duct inner wall 37a and the fan duct outer wall 37b.

FIG. 3A further shows the fixed portion 34 of the nacelle 15, such as in the form of the inlet cowl 34a, and shows the translating portion 50 of the nacelle 15, such as in the form of the translating sleeve 50a, with the pressure relief vents 52. The translating portion 50 (see FIG. 3A) is translated back in the aft direction 62 (see FIG. 3A), to uncover the cascade assembly 42 (see FIG. 3A). FIG. 3A further shows a torque box 66 coupled to the fixed portion 34 of the nacelle 15.

Now referring to FIG. 3B, FIG. 3B is an illustration of a front cross-sectional view of the known cascade assembly 42 of FIG. 2, coupled to the aft cascade support ring 44, and FIG. 3B shows the UP direction toward the top of the engine and the INBOARD direction toward the inboard side of the engine. FIG. 3B shows a support assembly 68 with the cascade assembly 42 surrounding the exterior of the support assembly 68. As shown in FIG. 3B, the cascade assembly 42 comprises a plurality of 16 (sixteen) cascades 42a surrounding the exterior of the support assembly 68, which is a typical number of cascades 42a for certain aircraft. FIG. 3B further shows 6 (six) thrust reverser actuators 46, such as in the form of hydraulic actuators 46a, for actuating the translating portion 50 (see FIGS. 2, 3A), such as the translating sleeve 50a (see FIGS. 2, 3A), in the aft direction 62 (see FIGS. 2, 3A). Although FIG. 3B shows 6 (six) thrust reverser actuators 46, other nacelles may have four (4), eight (8), or another suitable number of thrust reverser actuators 46 per nacelle. FIG. 3B further shows a translating assembly 70 with 4 (four) sliders 70a, 70b, 70c, 70d, or rails, over which the translating portion 50 (see FIGS. 2, 3A), such as the translating sleeve 50a (see FIGS. 2, 3A) slides, when the translating portion 50 is actuated by the thrust reverser actuators 46.

Figure 3C:
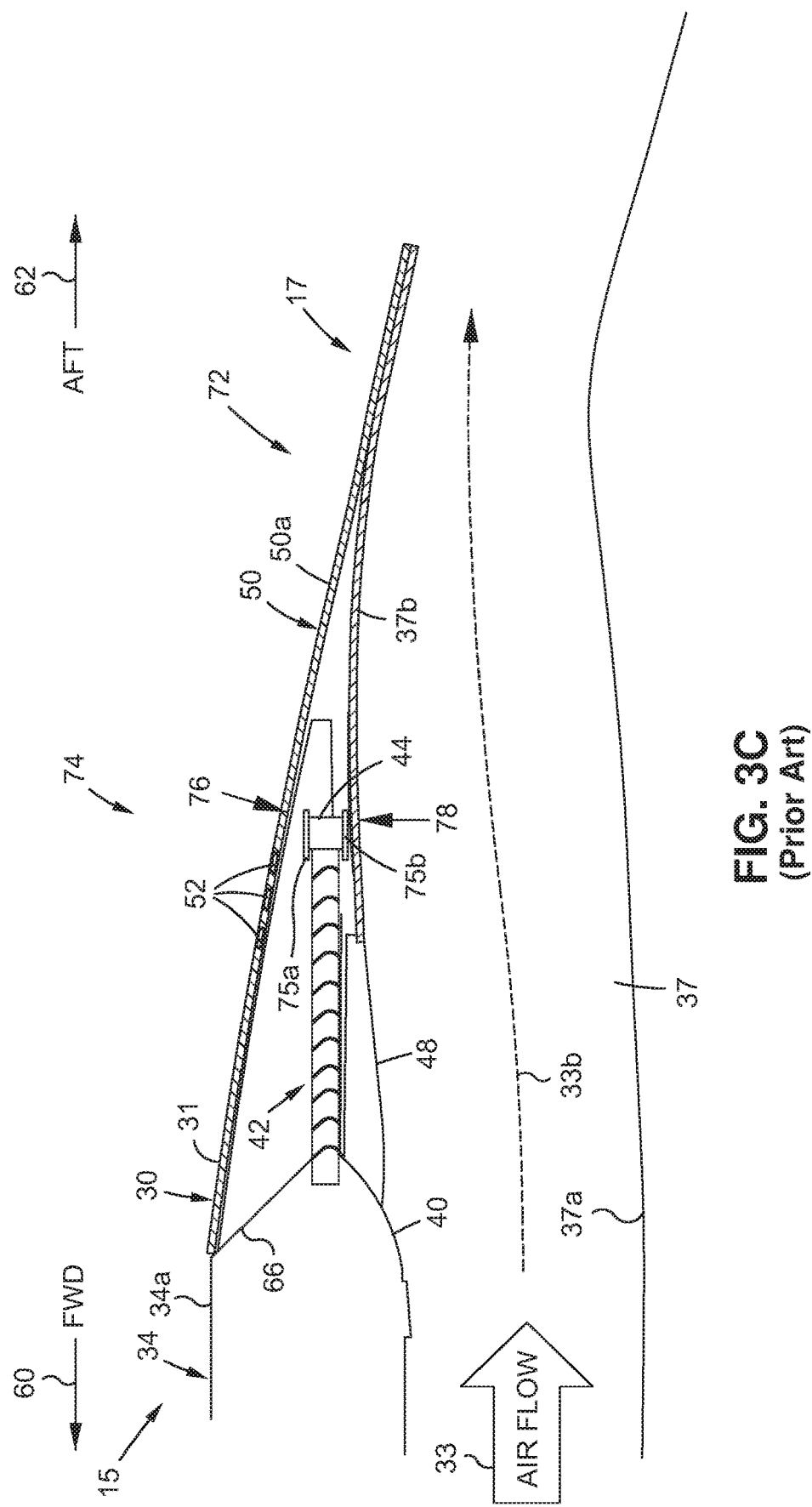
FIG. 3C is an illustration of a partial sectional side view of the known cascade-type thrust reverser system of FIG. 3A, in a stowed non-reversing position.

Now referring to FIG. 3C, FIG. 3C is an illustration of a partial sectional side view of the known engine 17 with the known cascade-type thrust reverser system 30 of FIG. 3A, with the with the thrust reverser 31 in a stowed non-reversing position 72. FIG. 3C shows the known cascade-type thrust reverser system 30 in a stowed forward thrust mode 74. FIG. 3C further shows the air flow 33, such as the fan air flow 33b, flowing through the fan duct 37 and along the fan duct inner wall 37a and the fan duct outer wall 37b, to generate a forward thrust. The blocker doors 48 (see FIG. 3C) are stowed. The cascade assembly 42 (see FIG. 3C), which is coupled to the aft cascade support ring 44 (see FIG. 3C), is stowed.

FIG. 3C further shows the fixed portion 34 of the nacelle 15, such as in the form of the inlet cowl 34a, and shows the translating portion 50 of the nacelle 15, such as in the form of the translating sleeve 50a, with the pressure relief vents 52. The translating portion 50 (see FIG. 3C) is translated forward from the aft direction 62 (see FIG. 3C) to the forward direction 60 (see FIG. 3C), to cover the cascade assembly 42 (see FIG. 3C). FIG. 3C further shows the thrust reverser bullnose fairing 40 and the torque box 66.

During an aircraft's nacelle package product development design, thrust reverser cascade placement and positioning within the engine may be limited by its surrounding hard-point constraints, for example, the aft cascade support ring 44 (see FIG. 3C), the thrust reverser bullnose fairing 40 (see FIG. 3C), and the external nacelle 15 (see FIG. 3C) and fan duct outer wall 37b (see FIG. 3C) aerodynamic lines. FIG. 3C shows that the known engine 17 having the known cascade-type thrust reverser system 30 may have a first aft cascade support ring hard-point constraint 75a that constrains or limits an external nacelle aerodynamic line 76, which may, in turn, limit aerodynamic drag benefits. FIG. 3C further shows that the known engine 17 having the known cascade-type thrust reverser system 30 may have a second aft cascade support ring hard-point constraint 75b that may constrain or limit a fan duct outer wall aerodynamic line 78, which may, in turn, limit fan nozzle performance.

Now referring to FIG. 4, in a disclosed example, an inflatable cascade system 10 for a cascade thrust reverser (TR) system 24 of an engine 16, such as a gas turbine engine 16a, of a vehicle 11, such as an air vehicle 12, for example, an aircraft 12a, is provided. FIG. 4 is an illustration of a functional block diagram showing a disclosed example of the vehicle 11, such as the air vehicle 12, for example, the aircraft 12a, having disclosed examples of the inflatable cascade system 10 with an inflatable cascade assembly 80, for the cascade thrust reverser (TR) system 24, such as an inflatable cascade thrust reverser (TR) system 24a.

As shown in FIG. 4, the inflatable cascade system 10 comprises an inflatable cascade assembly 80 coupled to a fixed portion 174 of a nacelle 14 of the engine 16. The nacelle 14 (see FIG. 4) is preferably a shortened nacelle 14a (see FIG. 4) comprising the fixed portion 174 (see FIG. 4), such as an inlet cowl 174a (see FIG. 4), and a reduced length translating portion 170 (see FIG. 4), such as a reduced length translating sleeve 170a (see FIG. 4).

As shown in FIG. 4, the engine 16, such as the gas turbine engine 16a, comprises the cascade thrust reverser (TR) system 24, such as in the form of inflatable cascade thrust reverser (TR) system 24a, which comprises a cascade thrust reverser 176, such as in the form of an inflatable cascade thrust reverser 176a. The engine 16 further includes a thrust reverser (TR) bullnose fairing 40. The cascade thrust reverser 176, such as in the form of an inflatable cascade thrust reverser 176a is actuated by a thrust reverser actuator (TR ACT.) 177. As shown in FIG. 4, the thrust reverser actuator 177 may comprise a hydraulic actuator 177a, a pneumatic actuator 177b, a mechanical actuator 177c, an electrical actuator 177d, or another suitable actuator for actuating a thrust reverser. The thrust reverser actuator 177 (see FIG. 4) is controlled with an actuator (ACT.) controller 178, and is powered with power from an actuator (ACT.) power source 179.

The actuator controller 178 (see FIG. 4) may comprise one of, a hydraulic actuator controller, a pneumatic actuator controller, a mechanical actuator controller, an electrical actuator controller, or another suitable actuator controller. The actuator power source 179 (see FIG. 4) may comprise one of, a hydraulic actuator power source, such as hydraulic power or hydraulic fluid; a pneumatic actuator power source, such as high pressure air; a mechanical actuator power source, such as a rack and pinion; an electrical actuator power source, such as a motor; or another suitable actuator power source.

As further shown in FIG. 4, the inflatable cascade assembly 80 comprises a plurality of inflatable cascade members 82 movable between a stowed deflated state 84, when the cascade thrust reverser system 24 is in a stowed forward thrust mode 181, and a deployed inflated state 86, when the cascade thrust reverser system 24 is in a deployed reverse thrust mode 186. As further shown in FIG. 4, each inflatable cascade member 82 comprises a forward end 88a, an aft end 88b, a plurality of first side ends 116a or side end portions, a plurality of second side ends 116b or side end portions, and a body 90 formed between the forward end 88a and the aft end 88b, and formed between the first side ends 116a and the second side ends 116b.

The body 90 (see FIG. 4) of each inflatable cascade member 82 (see FIG. 4) preferably comprises a plurality of circumferential vanes 92 (see FIG. 4) that are spaced apart and laterally extending. Each circumferential vane 92 (see FIG. 4) comprises a first non-inflatable rigid side 94 (see FIG. 4) formed or adjacent to a second inflatable flexible side 96 (see FIG. 4). The second inflatable flexible side 96 (see FIG. 4) preferably has a thickness 100 (see FIG. 4) that is greater than a thickness 98 (see FIG. 4) of the first non-inflatable rigid side 94 (see FIG. 4), when the inflatable cascade member 82 (see FIG. 4) is in the deployed inflated state 86 (see FIG. 4). The thickness 100 of the second inflatable flexible side 96 may be five (5) times greater than the thickness 98 of the first non-inflatable rigid side 94, when the inflatable cascade member 82 (see FIG. 4) is in the deployed inflated state 86 (see FIG. 4). When the inflatable cascade member 82 (see FIG. 4) is in the stowed deflated state 84 (see FIG. 4), the thickness of the first non-inflatable rigid side 94 is preferably greater than the thickness of the second inflatable flexible side 96. In the stowed deflated state 84 (see FIGS. 4, 6B), the material making up the first non-inflatable rigid side 94 (see FIG. 6B) may preferably be thicker and more rigid because it is facing a higher pressure area and may be exposed to a higher pressure, and to provide a shape or configuration of each circumferential vane 92 (see FIG. 4) to turn or reverse the fan air flow 33b (see FIG. 9A). The material making up the second inflatable flexible side 96 (see FIG. 6B) may preferably be thinner because it is facing a lower pressure area and may be exposed to a lower pressure.

The body 90 (see FIG. 4) of each inflatable cascade member 82 (see FIG. 4) preferably further comprises a plurality of inflatable support members 102 (see FIG. 4), such as in the form of inflatable strongbacks 102a (see FIG. 4), that are spaced apart and longitudinally extending. The plurality of inflatable support members 102 (see FIGS. 4, 5D) is coupled in a perpendicular arrangement 104 (see FIG. 5C) to the plurality of circumferential vanes 92 (see FIGS. 4, 5D). The plurality of inflatable support members 102, such as in the form of inflatable strongbacks 102a, are movable between a stowed deflated position 108 (see FIG. 4), when the cascade thrust reverser system 24 (see FIG. 4) is in a stowed forward thrust mode 181 (see FIG. 4), and a deployed inflated position 110 (see FIG. 4), when the cascade thrust reverser system 24 is in a deployed reverse thrust mode 186 (see FIG. 4).

The second inflatable flexible side 96 (see FIG. 4) of the plurality of circumferential vanes 92 (see FIG. 4), and the plurality of inflatable support members 102 (see FIG. 4), are preferably both made of a flexible material 112 (see FIG. 4) comprising one of, a para-aramid synthetic fiber, nylon, rubber, polyvinyl chloride, polyethylene, polypropylene, or another suitable flexible material. Preferably, the para-aramid synthetic fiber is KEVLAR para-aramid synthetic fiber obtained from E. I. Du Pont De Nemours and Company of Wilmington, Del. (KEVLAR is a registered trademark of E. I. Du Pont De Nemours and Company of Wilmington, Del.)

The body 90 (see FIG. 4) further comprises a plurality of flow openings 106 (see FIG. 4). The flow openings 106 (see FIG. 4) are defined between the plurality of circumferential vanes 92 (see FIG. 4) and the plurality of inflatable support members 102 (see FIG. 4).

Each inflatable cascade member 82 (see FIG. 4) further comprises extendable side supports 118 (see FIG. 4). The extendable side supports 118 (see FIG. 4) preferably comprise a first extendable side support 118a (see FIG. 4) coupled to the first side ends 116a (see FIG. 4) of the body 90 (see FIG. 4), and a second extendable side support 118b (see FIG. 4) coupled to the second side ends 116b (see FIG. 4) of the body 90. The second extendable side support 118b (see FIG. 4) is preferably positioned opposite the first extendable side support 118a (see FIG. 4). The first extendable side support 118a (see FIG. 4) and the second first extendable side support 118b (see FIG. 4) are preferably positioned parallel to the plurality of inflatable support members 102 (see FIG. 4).

As shown in FIG. 4, the inflatable cascade assembly 80 may further comprise a plenum chamber 136. The plenum chamber 136 (see FIG. 4) is preferably coupled at the forward end 88a (see FIG. 4) of each inflatable cascade member 82 and of the inflatable cascade assembly 80 (see FIG. 4), and coupled aft of the forward flow valve 150 (see FIG. 4). The plenum chamber 136 (see FIG. 4) distributes the pressurized fluid 120 (see FIG. 4) from the pressurized fluid supply system 122 (see FIG. 4) uniformly within each inflatable cascade member 82 (see FIG. 4). The plenum chamber 136 (see FIG. 4) preferably comprises an orifice plate portion 138 (see FIG. 4).

As shown in FIG. 4, the inflatable cascade system 10 further comprises a forward flow valve 150. The forward flow valve (see FIG. 4) is preferably coupled to the forward end 88a (see FIG. 4) of the inflatable cascade member 82 (see FIG. 4). The forward flow valve 150 (see FIG. 4) preferably comprises an electronic flow control valve 150a (see FIG. 4), or another suitable flow control valve or mechanism.

As shown in FIG. 4, the inflatable cascade system 10 (see FIG. 4) further comprises a pressurized fluid supply system 122. The pressurized fluid supply system 122 (see FIG. 4) is coupled to the forward flow valve 150 (see FIG. 4), which is, in turn, coupled to the inflatable cascade assembly 80 (see FIG. 4). As shown in FIG. 4, the pressurized fluid supply system 122 may comprise one of, a pressurized air supply system 122a, an engine compressor bleed air supply system 122b, a compressed air supply system 122c, one or more compressed air bottles 122d, a ram air supply system 122e, a hydraulic fluid system 26, or another suitable pressurized fluid supply system 122.

The pressurized fluid supply system 122 (see FIG. 4) provides a pressurized fluid 120 (see FIG. 4) to the plurality of inflatable cascade members 82 (see FIG. 4), via the forward flow valve 150 (see FIG. 4), to inflate the plurality of inflatable cascade members 82. As shown in FIG. 4, the pressurized fluid 120 may comprise one of, pressurized air 120a, engine compressor bleed air 120b, compressed air 120c, hydraulic fluid 120d, ram air 120e, or another suitable pressurized fluid 120.

As shown in FIG. 4, the inflatable cascade system 10 further comprises a translating aft cascade support ring 140. The translating aft cascade support ring 140 (see FIG. 4) is coupled at the aft end 88b (see FIG. 4) of the inflatable cascade member 82 (see FIG. 4). The translating aft cascade support ring 140 (see FIG. 4) is configured for coupling to a translating apparatus 148 (see FIG. 4). The translating apparatus 148 (see FIG. 4), such as in the form of a slider apparatus 148a (see FIG. 4), is configured to move the translating aft cascade support ring 140 (see FIG. 4). The translating aft cascade support ring 140 (see FIG. 4), in turn, moves the plurality of inflatable cascade members 82 (see FIG. 4) between the stowed deflated state 84 (see FIG. 4) and the deployed inflated state 86 (see FIG. 4), to elongate and shorten the plurality of inflatable cascade members 82 (see FIG. 4). As shown in FIG. 4, the translating aft cascade support ring 140 may have a rectangular configuration 140a, a C-shaped configuration 140b, a Z-shaped configuration 140c, an I-shaped configuration 140d, or another suitable configuration or shape.

As shown in FIG. 4, the inflatable cascade system 10 further comprises an aft flow valve 160 coupled to the aft end 88b of the inflatable cascade member 82. The aft flow valve 160 (see FIG. 4) preferably comprises an electronic flow control valve 160a (see FIG. 4), or another suitable flow control valve or mechanism. The aft flow valve 160 (see FIG. 4) is configured to release any trapped fluid 189 (see FIGS. 9C-9D) from the plurality of inflatable cascade members 82 (see FIG. 4), after the plurality of inflatable cascade members 82 have inflated.

As shown in FIG. 4, the inflatable cascade system 10 may further comprise one or more safety devices 190 comprising one or more pressure sensors 190a, or pressure transducers or pressure transmitters, configured to signal or trigger an electronic signal for one or more of, an air leakage 191a in the inflatable cascade system 10, a cascade breach 191b of one or more of the plurality of inflatable cascade members 82, or another safety issue. In addition, during the stowed forward thrust mode 181 (see FIG. 4), to eliminate any unwanted inflation 191c (see FIG. 4), or pressurization, due to a possible issue or problem with the forward flow valve 150 (see FIG. 4), the aft flow valve 160 (see FIG. 4) may be kept in an open position.

As shown in FIG. 4, the inflatable cascade system 10 allows for a shortened nacelle 14a design that preferably provides a reduced aerodynamic drag 274, for example, a reduced nacelle external drag 275. In addition, the inflatable cascade system 10 allows for a shortened nacelle 14a design having a reduced weight 278 and a reduced length 279. Further, the inflatable cascade system 10 allows for an engine 16 with an increased fan duct efficiency 276 and an increased fan nozzle efficiency 277.

Now referring to FIGS. 5A-5C, FIG. 5A is an illustration of a side view of a disclosed example of an inflatable cascade assembly 80 in a deployed inflated state 86, where the inflatable cascade assembly 80 is coupled to the translating aft cascade support ring 140. FIG. 5B is an illustration of a close-up side view of the inflatable cascade assembly 80 shown in circle 5B of FIG. 5A. FIG. 5C is an illustration of a close-up top view of the inflatable cascade assembly 80 of FIG. 5B.

The inflatable cascade assembly 80 (see FIGS. 5A-5C) comprises the inflatable cascade member 82 (see FIGS. 5A, 5B) having the forward end 88a (see FIG. 5A), the aft end 88b (see FIG. 5A), the body 90 (see FIGS. 5A-5C) formed between the forward end 88a and the aft end 88b, the first side ends 116a (see FIG. 5C) of the body 90, and the second side ends 116b (see FIG. 5C) of the body 90. The forward end 88a (see FIG. 5A) of the inflatable cascade member 82 (see FIGS. 5A, 5C) is configured to receive the pressurized fluid 120 (see FIGS. 5A, 5C) via the forward flow valve 150 (see FIG. 4).

FIGS. 5A-5C show the plurality of circumferential vanes 92 that are spaced apart and laterally extending, and the plurality of inflatable support members 102, such as in the form of inflatable strongbacks 102a, that are spaced apart and longitudinally extending. The plurality of inflatable support members 102 (see FIGS. 5A-5D) is coupled in a perpendicular arrangement 104 (see FIG. 5C) to the plurality of circumferential vanes 92 (see FIGS. 5A-5D). FIG. 5C shows the inflatable support members 102 in a deployed inflated position 110.

Each circumferential vane 92 (see FIGS. 5A-5C) comprises the first non-inflatable rigid side 94 (see FIGS. 5B, 5C) formed or attached adjacent to the second inflatable flexible side 96 (see FIGS. 5B, 5C). As shown in FIG. 5B, the second inflatable flexible side 96 has an interior 97a and an exterior 97b. As further shown in FIG. 5B, the second inflatable flexible side 96 preferably has a thickness 100 that is greater than a thickness 98 of the first non-inflatable rigid side 94, when the inflatable cascade member 82 and the inflatable cascade assembly 80 is in the deployed inflated state 86.

As shown in FIG. 5A, the inflatable cascade member 82 of the inflatable cascade assembly 80 has a deployed length 87. The deployed length 87 (see FIG. 5A) is greater than a stowed length 85 (see FIG. 6A) of the inflatable cascade member 82 (see FIG. 6A) of the inflatable cascade assembly 80 (see FIG. 6A).

FIG. 5A further shows the translating aft cascade support ring 140 coupled at the aft end 88b of the inflatable cascade member 82. As shown in FIG. 5A, in this example, the translating aft cascade support ring 140 has a rectangular configuration 140a. As further shown in FIG. 5A, the translating aft cascade support ring 140 has a forward end 142a, an aft end 142b, and a body 144 formed between the forward end 142a and the aft end 142b.

FIG. 5C further shows the plurality of flow openings 106 defined between the plurality of circumferential vanes 92 and the plurality of inflatable support members 102, which plurality of circumferential vanes 92 and the plurality of inflatable support members 102 form a basket configuration 114. Further, FIG. 5C shows the extendable side supports 118 for the inflatable cascade member 82 of the inflatable cascade assembly 80. The extendable side supports 118 (see FIG. 5C) preferably comprise a first extendable side support 118a (see FIG. 5C) coupled to the plurality of first side ends 116a (see FIG. 5C) of the body 90 (see FIG. 5C), and a second extendable side support 118b (see FIG. 5C) coupled to the plurality of second side ends 116b (see FIG. 5C) of the body 90. The second extendable side support 118b (see FIG. 5C) is preferably positioned opposite the first extendable side support 118a (see FIG. 5C). The first extendable side support 118a (see FIG. 5C) and the second first extendable side support 118b (see FIG. 5C) are preferably positioned parallel to the plurality of inflatable support members 102 (see FIG. 5C).

Now referring to FIG. 5D, FIG. 5D is an illustration of a side perspective view of a disclosed example of the inflatable cascade assembly 80 comprising the inflatable cascade member 82, in the deployed inflated state 86, having the forward end 88a, the aft end 88b, the body 90 formed between the forward end 88a and the aft end 88b, the first side ends 116a of the body 90, and the second side ends 116b of the body 90. As shown in FIG. 5D, the forward end 88a faces in a forward direction 60, and the aft end 88b faces in an aft direction 62.

FIG. 5D further shows the plurality of circumferential vanes 92 that are spaced apart and laterally extending, and the plurality of inflatable support members 102, such as in the form of inflatable strongbacks 102a, that are spaced apart and longitudinally extending. The plurality of inflatable support members 102 (see FIG. 5D) is coupled in a perpendicular arrangement 104 (see FIG. 5D) to the plurality of circumferential vanes 92 (see FIG. 5D).

FIG. 5D further shows the plurality of flow openings 106 defined between the plurality of circumferential vanes 92 and the plurality of inflatable support members 102. Further, FIG. 5D shows the extendable side supports 118 for the inflatable cascade member 82 of the inflatable cascade assembly 80. The extendable side supports 118 (see FIG. 5D) preferably comprise the first extendable side support 118a (see FIG. 5D) coupled to the plurality of first side ends 116a (see FIG. 5D) of the body 90 (see FIG. 5C), and the second extendable side support 118b (see FIG. 5D) coupled to the plurality of second side ends 116b (see FIG. 5D) of the body 90. As shown in FIG. 5D, the second extendable side support 118b is positioned opposite the first extendable side support 118a, and the first extendable side support 118a and the second extendable side support 118b are positioned parallel to the plurality of inflatable support members 102.

Now referring to FIG. 6A, FIG. 6A is an illustration of a side view of the inflatable cascade assembly 80 of FIG. 5A in a stowed deflated state 84, where the inflatable cascade assembly 80 is coupled to the translating aft cascade support ring 140 with the rectangular configuration 140a. FIG. 6B is an illustration of a close-up side view of the inflatable cascade assembly 80 shown in circle 6B of FIG. 6A. FIG. 6C is an illustration of a close-up top view of the inflatable cascade assembly 80 of FIG. 6B.

The inflatable cascade assembly 80 (see FIGS. 6A-6C) comprises the inflatable cascade member 82 (see FIGS. 6A-6C) having the forward end 88a (see FIG. 6A), the aft end 88b (see FIG. 6A), the body 90 (see FIGS. 6A-6C) formed between the forward end 88a and the aft end 88b, the first side ends 116a (see FIG. 6C) of the body 90, and the second side ends 116b (see FIG. 6C) of the body 90. FIGS. 6A-6C show the plurality of circumferential vanes 92 that are spaced apart and laterally extending, and the plurality of inflatable support members 102, such as in the form of inflatable strongbacks 102a, that are spaced apart and longitudinally extending. FIG. 6C shows the inflatable support members 102 in a stowed deflated position 108.

Each circumferential vane 92 (see FIGS. 6A-6C) comprises the first non-inflatable rigid side 94 (see FIGS. 6B, 6C) formed or attached adjacent to the second inflatable flexible side 96 (see FIGS. 6B, 6C). As shown in FIG. 6A, the inflatable cascade member 82 of the inflatable cascade assembly 80 has the stowed length 85 that is less than the deployed length 87 (see FIG. 5A) of the inflatable cascade member 82 (see FIG. 5A) of the inflatable cascade assembly 80 (see FIG. 5A).

FIG. 6C further shows the plurality of flow openings 106 defined between the plurality of circumferential vanes 92 and the plurality of inflatable support members 102. Further, FIG. 5C shows the extendable side supports 118 for the inflatable cascade member 82 of the inflatable cascade assembly 80. The extendable side supports 118 (see FIG. 6C) preferably comprise the first extendable side support 118a (see FIG. 6C) coupled to the plurality of first side ends 116a (see FIG. 6C) of the body 90 (see FIG. 6C), and the second extendable side support 118b (see FIG. 6C) coupled to the plurality of second side ends 116b (see FIG. 6C) of the body 90.

Now referring to FIG. 7A, FIG. 7A is an illustration of a close-up side view of another disclosed example of the inflatable cascade assembly 80 comprising the inflatable cascade member 82 in the deployed inflated state 86, where the second inflatable flexible side 96 of the one or more of the plurality of circumferential vanes 92 has a tube configuration 128. As shown in FIG. 7A, the tube configuration 128 comprises a plurality of separate tube elements 130. FIG. 7A further shows the first non-inflatable rigid side 94 formed adjacent to or attached to the second inflatable flexible side 96 having the plurality of separate tube elements 130. FIG. 7A further shows the plurality of inflatable support members 102, such as the form of inflatable strongbacks 102a.

Now referring to FIG. 7B, FIG. 7B is an illustration of a close-up side view of yet another disclosed example of the inflatable cascade assembly 80 comprising the inflatable cascade member 82 in the deployed inflated state 86, where the second inflatable flexible side 96 of the one or more of the plurality of circumferential vanes 92 has a segmented configuration 132. As shown in FIG. 7B, the segmented configuration 132 comprises a plurality of continuous segmented elements 134. FIG. 7B further shows the first non-inflatable rigid side 94 formed adjacent to or attached to the second inflatable flexible side 96 having the plurality of continuous segmented elements 134. FIG. 7B further shows the plurality of inflatable support members 102, such as the form of inflatable strongbacks 102a.

Now referring to FIG. 8A, FIG. 8A is an illustration of a side view of a disclosed example of the inflatable cascade assembly 80 comprising the inflatable cascade member 82 in the deployed inflated state 86, having a plenum chamber 136 and a forward flow valve 150 at the forward end 88a, and having the translating aft cascade support ring 140 and an aft flow valve 160 at the aft end 88b. As further shown in FIG. 8A, the inflatable cascade assembly 80, comprising the inflatable cascade member 82, comprises the body 90, the plurality of circumferential vanes 92, and the plurality of inflatable support members 102, such as the plurality of inflatable strongbacks 102a.

Now referring to FIG. 8B, FIG. 8B is an illustration of a close-up side view of the inflatable cascade assembly 80 comprising the inflatable cascade member 82 in the deployed inflated state 86, as well as the plenum chamber 136 and the forward flow valve 150 at the forward end 88a, shown in circle 8B of FIG. 8A, where the inflatable cascade assembly 80 is coupled to a pressurized fluid supply system 122 via the forward flow valve 150. As shown in FIG. 8B, the plenum chamber 136 comprises an orifice plate portion 138 coupled or attached at the forward end 88a of the inflatable cascade assembly 80. The plenum chamber 136 (see FIG. 8B) is coupled or attached to the forward flow valve 150 (see FIG. 8B) via inlet ducts 126a (see FIG. 8B).

As further shown in FIG. 8B, the forward flow valve 150 is preferably in the form of an electronic flow control valve 150a, or another suitable type of flow control valve, and comprises a forward end 152a and an aft end 152b. As shown in FIG. 8B, the aft end 152b of the forward flow valve 150 is coupled to the inlet ducts 126a, and the forward end 152a of the forward flow valve 150 is coupled to supply ducts 124, which are, in turn, coupled or attached to the pressurized fluid supply system 122 having the pressurized fluid 122.

As further shown in FIG. 8B, the inflatable cascade assembly 80 comprising the inflatable cascade member 82, comprises the body 90, the plurality of circumferential vanes 92, and the plurality of inflatable support members 102, such as the plurality of inflatable strongbacks 102a. As further shown in FIG. 8B, each of the plurality of circumferential vanes 92 comprises the first non-inflatable rigid side 94 and the second inflatable flexible side 96.

Now referring to FIG. 8C, FIG. 8C is an illustration of a close-up side view of the inflatable cascade assembly 80 comprising the inflatable cascade member 82 in the deployed inflated state 86, as well as the translating aft cascade support ring 140 and the aft flow valve 160 at the aft end 88b, shown in circle 8C of FIG. 8A, where the inflatable cascade assembly 80 is coupled to a plurality of pressure relief vents 128 via the aft flow valve 160.

As shown in FIG. 8C, the translating aft cascade support ring 140 has a C-shaped configuration 140b, and has a forward end 142a, an aft end 142b, and a body 144 formed between the forward end 142a and the aft end 142b. The translating aft cascade support ring 140 (see FIG. 8C) is coupled or attached to the aft flow valve 160 (see FIG. 8C) via outlet ducts 126b (see FIG. 8C).

As further shown in FIG. 8C, the aft flow valve 160 is preferably in the form of an electronic flow control valve 160a, or another suitable type of flow control valve, and comprises a forward end 162a and an aft end 162b. As shown in FIG. 8C, the forward end 162b of the aft flow valve 160 is coupled to the outlet ducts 126b, and the aft end 162b of the aft flow valve 160 is coupled to vent ducts 127, which are, in turn, coupled or attached to the pressure relief vents 128.

As further shown in FIG. 8C, the inflatable cascade assembly 80 comprising the inflatable cascade member 82, comprises the body 90, the plurality of circumferential vanes 92, and the plurality of inflatable support members 102, such as the plurality of inflatable strongbacks 102a. As further shown in FIG. 8C, each of the plurality of circumferential vanes 92 comprises the first non-inflatable rigid side 94 and the second inflatable flexible side 96.

Figure 9A:
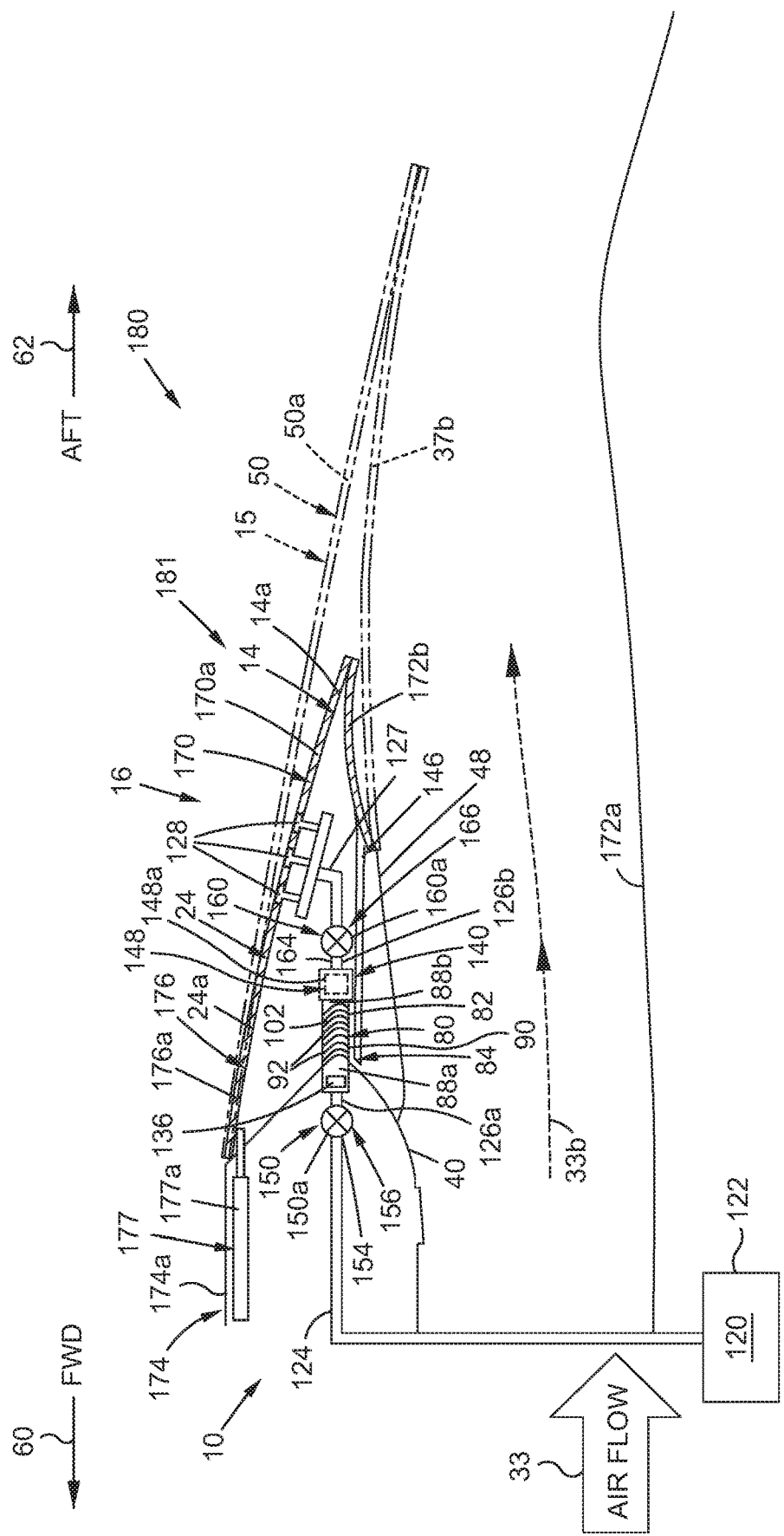
FIG. 9A is an illustration of a partial sectional side view of a disclosed example of an inflatable cascade system in a stowed position at forward thrust stage.

Now referring to FIG. 9A, FIG. 9A is an illustration of a partial sectional side view of a disclosed example of an inflatable cascade system 10 for an engine 16, in a stowed position at forward thrust stage 180. As shown in FIG. 9A, the nacelle 14 is in the form of a shortened nacelle 14a comprising a reduced length translating portion 170, such as a reduced length translating sleeve 170a, that may be actuated or moved via thrust reverser actuators 177, such as hydraulic actuators 177a, and comprising a fixed portion 174, such as an inlet cowl 174a. The inflatable cascade system 10 (see FIG. 9A) with the inflatable cascade assembly 80 (see FIG. 9A) comprising the inflatable cascade member 82 (see FIG. 9A), significantly reduces the length of the nacelle 14 (see FIG. 9A), for example, the reduced length translating portion 170 (see FIG. 9A), such as the reduced length translating sleeve 170a (see FIG. 9A), as compared to the longer known nacelle 15 (see FIG. 9A) and the longer known translating portion 50 (see FIG. 9A), such as the longer known translating sleeve 50a (see FIG. 9A), of the known nacelle 15.

FIG. 9A further shows a cascade thrust reverser system 24, such as an inflatable cascade thrust reverser system 24a, having a cascade thrust reverser 176, such as an inflatable cascade thrust reverser 176a, in a stowed forward thrust mode 181. FIG. 9A further shows a fan duct inner wall 172a and a shortened fan duct outer wall 172b, as compared to a longer known fan duct outer wall 37b. In FIG. 9A, air flow 33 flows into the engine 16, and becomes fan air flow 33b, which flows past the thrust reverser bullnose fairing 40, past the blocker doors 48 which are stored in a blocker door storage area 146, and past the fan duct inner wall 172a and the shortened fan duct outer wall 172b. The blocker doors 48 are moved or deployed with a drag-link mechanism or another suitable deployment mechanism or apparatus.

FIG. 9A shows the inflatable cascade system 10 with the inflatable cascade assembly 80 comprising the inflatable cascade member 82 in the stowed deflated state 84. FIG. 9A further shows the forward end 88a, the aft end 88b, and the body 90 disposed between the forward end 88a and the aft end 88b, of the inflatable cascade member 82, and shows the plurality of circumferential vanes 92, the plurality of inflatable support members 102, and the plenum chamber 136 at the forward end 88a of the inflatable cascade assembly 80.

As shown in FIG. 9A, the inflatable cascade system 10 further comprises the forward flow valve 150, such as in the form of an electronic flow control valve 150a, coupled to the forward end 88a of the inflatable cascade assembly 80, via the inlet ducts 126a. As shown in FIG. 9A, in the stowed position at forward thrust stage 180, the forward flow valve 150 is in a closed position 156. The forward flow valve 150 (see FIG. 9A) is preferably located at a forward location 154 (see FIG. 9A) that is in a forward direction 60 (see FIG. 9A) to the inflatable cascade assembly 80 (see FIG. 9A).

As shown in FIG. 9A, the inflatable cascade system 10 further comprises the pressurized fluid supply system 122 coupled to the forward flow valve 150 via the supply ducts 124. The pressurized fluid supply system 122 (see FIG. 9A) contains the pressurized fluid 120 (see FIG. 9A), which is configured to flow to the inflatable cascade assembly 80, via the forward flow valve 150, and inflate the inflatable cascade assembly 80 comprising the inflatable cascade member 82.

As shown in FIG. 9A, the inflatable cascade system 10 further comprises the translating aft cascade support ring 140 coupled at the aft end 88b of the inflatable cascade assembly 80. The translating aft cascade support ring 140 (see FIG. 9A) is coupled to a translating apparatus 148 (see FIG. 9A), such as in the form of a slider apparatus 148a (see FIG. 9A).

As shown in FIG. 9A, the inflatable cascade system 10 further comprises the aft flow valve 160, such as in the form of an electronic flow control valve 160a, coupled to the aft end 88b of the inflatable cascade assembly 80, via the outlet ducts 126b. As shown in FIG. 9A, in the stowed position at forward thrust stage 180, the aft flow valve 160 is in a closed position 166. The aft flow valve 160 (see FIG. 9A) is preferably located at an aft location 164 (see FIG. 9A) that is in an aft direction 62 (see FIG. 9A) to the inflatable cascade assembly 80 (see FIG. 9A). The aft flow valve 160 (see FIG. 9A) is coupled to one or more vent ducts 127 (see FIG. 9A) that are coupled to one or more pressure relief vents 128 (see FIG. 9A).

Thus, in the operation of the inflatable cascade system 10 (see FIGS. 4, 9A-9D), during the stowed position at forward thrust stage 180 (see FIG. 9A) and the stowed forward thrust mode 181 (see FIG. 9A), i.e., stowed position: 0% deployed, the inflatable cascade assembly 80 (see FIGS. 4, 9A) remains in the stowed deflated state 84 (see FIG. 6A), or flat position, and enables a compact design for the reduced length translating sleeve 170a (see FIGS. 4, 9A).

Figure 9B:
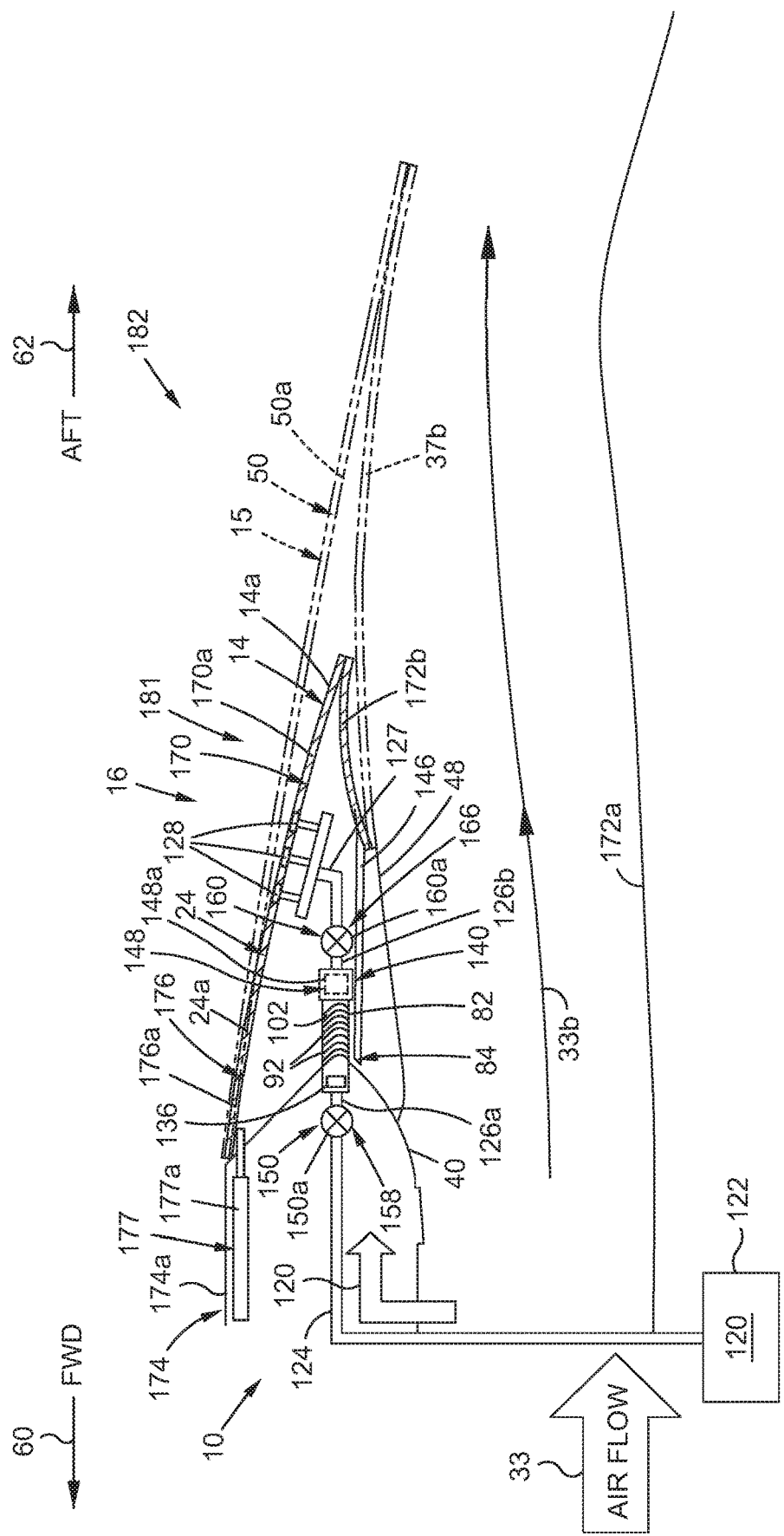
FIG. 9B is an illustration of a partial sectional side view of the inflatable cascade system of FIG. 9A in a stowed position after landing and prior to thrust reverser deployment stage.

Now referring to FIG. 9B, FIG. 9B is an illustration of a partial sectional side view of the inflatable cascade system 10 of FIG. 9A for the engine 16, in a stowed position after landing and prior to thrust reverser deployment stage 182. In this stowed position after landing and prior to thrust reverser deployment stage 182 (see FIG. 9B), the forward flow valve 150 (see FIG. 9B), such as in the form of the electronic flow control valve 150a (see FIG. 9B), is opened from the closed position 156 (see FIG. 9A) to an open position 158 (see FIG. 9B), so that the pressurized fluid 120 (see FIG. 9B), from the pressurized fluid supply system 122 (see FIG. 9B), can flow through the supply ducts 124 (see FIG. 9B), through the forward flow valve 150 (see FIG. 9B) in the open position 158 (see FIG. 9B), and into the inflatable cascade assembly 80 (see FIG. 9B) via the inlet ducts 126a The pressurized fluid 120 (see FIG. 9B) may comprise pressurized air 120a (see FIG. 4), engine compressor bleed air 120b (see FIG. 4), compressed air 120c (see FIG. 4), hydraulic fluid 120d (see FIG. 4), ram air 120e (see FIG. 4), or another suitable pressurized fluid 120.

During the stowed position after landing and prior to thrust reverser deployment stage 182 (see FIG. 9B), the pressurized fluid 120 (see FIGS. 4, 9B), for example, the engine compressor bleed air 120b (see FIG. 4) from the engine's 16 (see FIG. 4) high pressure compressor, i.e., fourth stage or tenth stage, is preferably fed to the inflatable cascade assembly 80 (see FIGS. 4, 9B) in the stowed deflated state 84 (see FIG. 9B), via the plenum chamber 136 (see FIG. 9B), and is regulated using the forward flow valve 150 (see FIGS. 4, 9B). In another example, the pressurized fluid 120 (see FIG. 4) may comprise compressed air 120c (see FIG. 4) supplied from a compressed air supply system 122c (see FIG. 4), such as one or more compressed air bottles 122d (see FIG. 4).

As shown in FIG. 9B, the nacelle 14, such as the shortened nacelle 14a, comprises the reduced length translating portion 170, such as the reduced length translating sleeve 170a, which is actuated or moved via the thrust reverser actuators 177, such as hydraulic actuators 177a, in the aft direction 62 and in the forward direction 60. The nacelle 14 (see FIG. 9B) further comprises the fixed portion 174, such as the inlet cowl 174a.

As discussed above, the inflatable cascade system 10 (see FIG. 9B) with the inflatable cascade assembly 80 (see FIG. 9B) comprising the inflatable cascade member 82 (see FIG. 9B), significantly reduces the length of the nacelle 14 (see FIG. 9B), for example, the reduced length translating portion 170 (see FIG. 9B), such as the reduced length translating sleeve 170a (see FIG. 9B), as compared to the longer known nacelle 15 (see FIG. 9B) and the longer known translating portion 50 (see FIG. 9B), such as the longer known translating sleeve 50a (see FIG. 9B), of the known nacelle 15.

The cascade thrust reverser system 24 (see FIG. 9B), such as the inflatable cascade thrust reverser system 24a (see FIG. 9B), having the cascade thrust reverser 176 (see FIG. 9B), such as the inflatable cascade thrust reverser 176a (see FIG. 9B), is still in the stowed forward thrust mode 181 (see FIG. 9B). FIG. 9B further shows the fan duct inner wall 172a and the shortened fan duct outer wall 172b, as compared to the longer known fan duct outer wall 37b. In FIG. 9B, the air flow 33 still flows into the engine 16, and becomes fan air flow 33b, which flows past the thrust reverser bullnose fairing 40, past the blocker doors 48 stored in the blocker door storage area 146, and past the fan duct inner wall 172a and the shortened fan duct outer wall 172b. The blocker doors 48 (see FIG. 9B) are moved or deployed with a drag-link mechanism or another suitable deployment mechanism or apparatus.

FIG. 9B shows the inflatable cascade system 10 with the inflatable cascade assembly 80 comprising the inflatable cascade member 82 still in the stowed deflated state 84. FIG. 9B further shows the plurality of circumferential vanes 92, the plurality of inflatable support members 102, and the plenum chamber 136. As shown in FIG. 9B, the inflatable cascade system 10 further comprises the translating aft cascade support ring 140 coupled to the translating apparatus 148 (see FIG. 9B), such as in the form of the slider apparatus 148a (see FIG. 9B).

As the inflatable cascade assembly 80 (see FIGS. 4, 9C) translates and deploys to perform a thrust reverser operation, the translating aft cascade support ring 140 (see FIGS. 4, 9C) slides over the translating apparatus 148 (see FIG. 4, 9C), such as the slider apparatus 148a (see FIGS. 4, 9C), using the thrust reverser actuators 177 (see FIGS. 4, 9C), such as the hydraulic actuators 177a (see FIGS. 4, 9C), or another suitable actuator, and the inflatable cascade assembly 80 comprising the inflatable cascade member 82 (see FIGS. 4, 9C) gets pressurized by the pressurized fluid 120 (see FIGS. 4, 9C) supplied from the pressurized fluid supply system 122 (see FIGS. 4, 9C) and assumes a similar shape to the solid cascades. During this transition, the aft flow valve 160 (see FIGS. 4, 9C) remains closed in the closed position 166 (see FIG. 9C).

As shown in FIG. 9B, the aft flow valve 160, such as in the form of the electronic flow control valve 160a, is coupled to the inflatable cascade assembly 80, via the outlet ducts 126b. The aft flow valve 160 (see FIG. 9B) is coupled to the one or more vent ducts 127 (see FIG. 9B) that are coupled to the one or more pressure relief vents 128 (see FIG. 9B). As shown in FIG. 9B, in the stowed position after landing and prior to thrust reverser deployment stage 182, the aft flow valve 160 is still in the closed position 166.

Figure 9C:
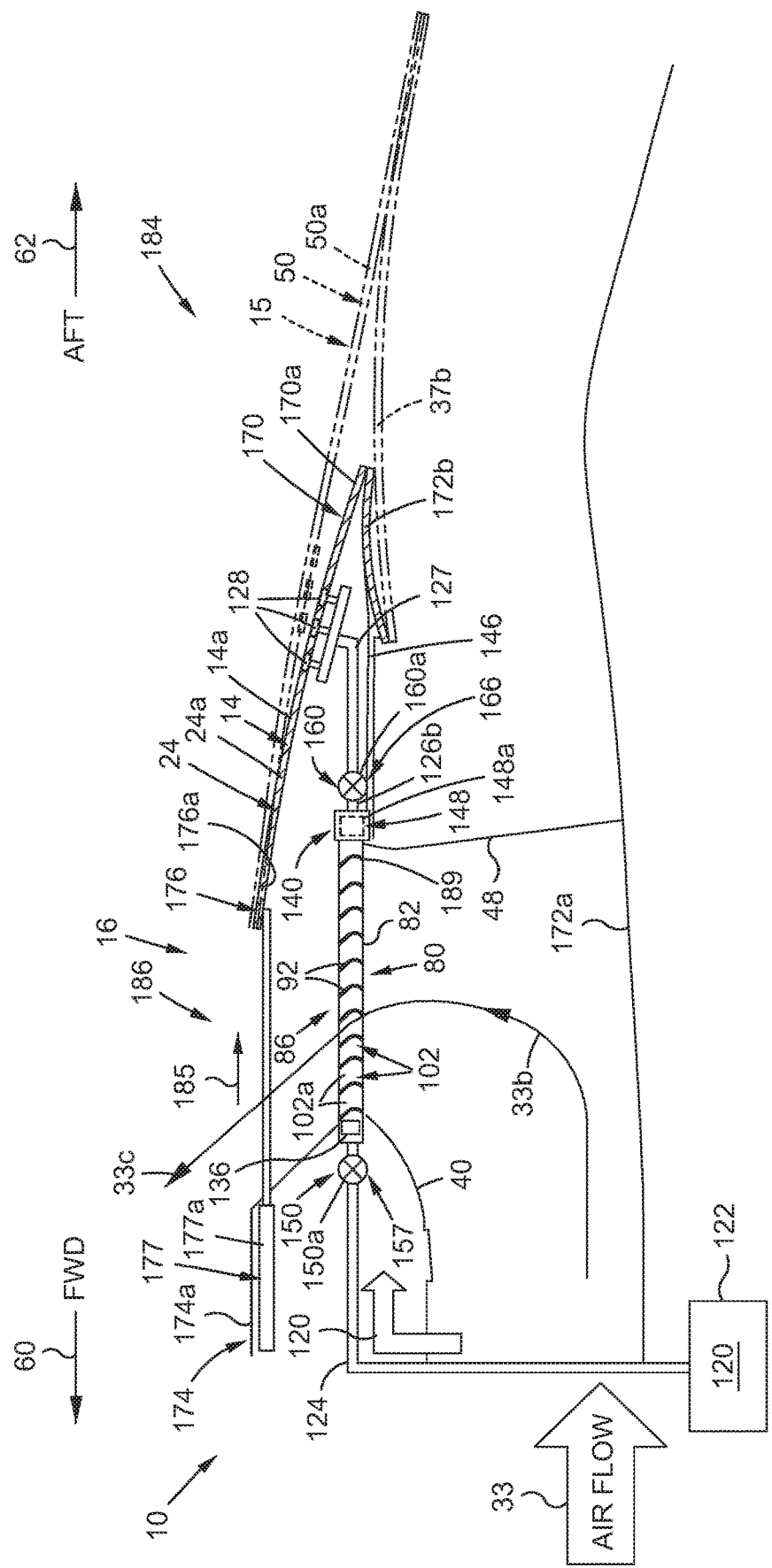
FIG. 9C is an illustration of a partial sectional side view of the inflatable cascade system of FIG. 9A in a fully deployed position at reverse thrust stage.

Now referring to FIG. 9C, FIG. 9C is an illustration of a partial sectional side view of the inflatable cascade system 10 of FIG. 9A for the engine 16, in a fully deployed position at reverse thrust stage 184. In this fully deployed position at reverse thrust stage 184 (see FIG. 9C), the forward flow valve 150 (see FIG. 9C), such as in the form of the electronic flow control valve 150a (see FIG. 9C), is closed slightly, so that it is in a semi-open position 157 (see FIG. 9C), and the aft flow valve 160 (see FIG. 9C), such as in the form of the electronic flow control valve 160a (see FIG. 9C), is still in the closed position 166 (see FIG. 9C). With the forward flow valve 150 (see FIG. 9C) in the semi-open position 157 (see FIG. 9C), the pressurized fluid 120 (see FIG. 9C) from the pressurized fluid supply system 122 (see FIG. 9C) can still flow through the supply ducts 124 (see FIG. 9C), through the forward flow valve 150, and into the inflatable cascade assembly 80 (see FIG. 9C).

As shown in FIG. 9C, the nacelle 14, such as the shortened nacelle 14a, comprises the reduced length translating portion 170, such as the reduced length translating sleeve 170a, which is actuated or deployed via the thrust reverser actuators 177, such as hydraulic actuators 177a, in a deployment direction 185, such as the aft direction 62. The nacelle 14 (see FIG. 9C) further comprises the fixed portion 174 (see FIG. 9C), such as the inlet cowl 174a (see FIG. 9C), which is fixed and does not translate in the aft direction 62 (see FIG. 9C). As shown in FIG. 9C, the thrust reverser actuator 177 is attached at a one end which is fixed to the fixed portion 174 and is attached at another translating end to the reduced length translating portion 170.

As discussed above, the inflatable cascade system 10 (see FIG. 9C) with the inflatable cascade assembly 80 (see FIG. 9C) comprising the inflatable cascade member 82 (see FIG. 9C), significantly reduces the length of the nacelle 14 (see FIG. 9C). For example, the reduced length translating portion 170 (see FIG. 9C), such as the reduced length translating sleeve 170a (see FIG. 9C), is shorter in length, as compared to the longer known nacelle 15 (see FIG. 9C) and the longer known translating portion 50 (see FIG. 9C), such as the longer known translating sleeve 50a (see FIG. 9C), of the known nacelle 15.

The cascade thrust reverser system 24 (see FIG. 9C), such as the inflatable cascade thrust reverser system 24a (see FIG. 9C), having the cascade thrust reverser 176 (see FIG. 9C), such as the inflatable cascade thrust reverser 176a (see FIG. 9C), is shown in a deployed reverse thrust mode 186 (see FIG. 9C). FIG. 9C further shows the fan duct inner wall 172a and the shortened fan duct outer wall 172b, as compared to the longer known fan duct outer wall 37b. In FIG. 9C, the air flow 33, such as in the form of fan air flow 33b, cannot flow past the blocker doors 48 which are now deployed, and is diverted or deflected past the thrust reverser bullnose fairing 40, and through the inflatable cascade assembly 80 comprising the inflatable cascade member 82, and in particular, through the plurality of circumferential vanes 92 and through the plurality of inflatable support members 102, such as the plurality of strongbacks 102a. As shown in FIG. 9C, the inflatable cascade assembly 80 is in a deployed inflated state 86. The fan air flow 33b (see FIG. 9C) flows through the inflatable cascade assembly 80 (see FIG. 9C) which turns the fan air flow 33b as it exits out of the engine 16 (see FIG. 9C) to become reverse efflux air flow 33c (see FIG. 9C) which flows out in a generally forward direction 60 (see FIG. 9C) and generates the thrust reverser effect.

FIG. 9C shows the inflatable cascade system 10 with the inflatable cascade assembly 80 comprising the inflatable cascade member 82 in the deployed inflated state 86, where the inflatable cascade member 82 has trapped fluid 189 when in the deployed inflated state 86. FIG. 9C further shows the plenum chamber 136 and the translating aft cascade support ring 140 coupled to the translating apparatus 148, such as in the form of the slider apparatus 148a (see FIG. 9B).

As shown in FIG. 9C, the aft flow valve 160, such as in the form of the electronic flow control valve 160a, is coupled to the inflatable cascade assembly 80, via the outlet ducts 126b. The aft flow valve 160 (see FIG. 9C) is coupled to the one or more vent ducts 127 (see FIG. 9C) that are coupled to the one or more pressure relief vents 128 (see FIG. 9C).

Thus, at the fully deployed position at reverse thrust stage 184 (see FIG. 9C), the reduced length translating sleeve 170a (see FIG. 9C) is fully deployed, along with the fully deployed blocker doors 48 (see FIG. 9C), and the inflatable cascade assembly 80 (see FIG. 9C) comprising the inflatable cascade member 82 (see FIG. 9C), turns the fan air flow 33b (see FIG. 9C) as it exits the engine 16 (see FIG. 9C) to become reverse efflux air flow 33c (see FIG. 9C) to generate the reverse thrust and slow down the air vehicle 12 (see FIG. 1) such as the aircraft 12a (see FIG. 1) by generating the aerodynamic breaking.

Figure 9D:
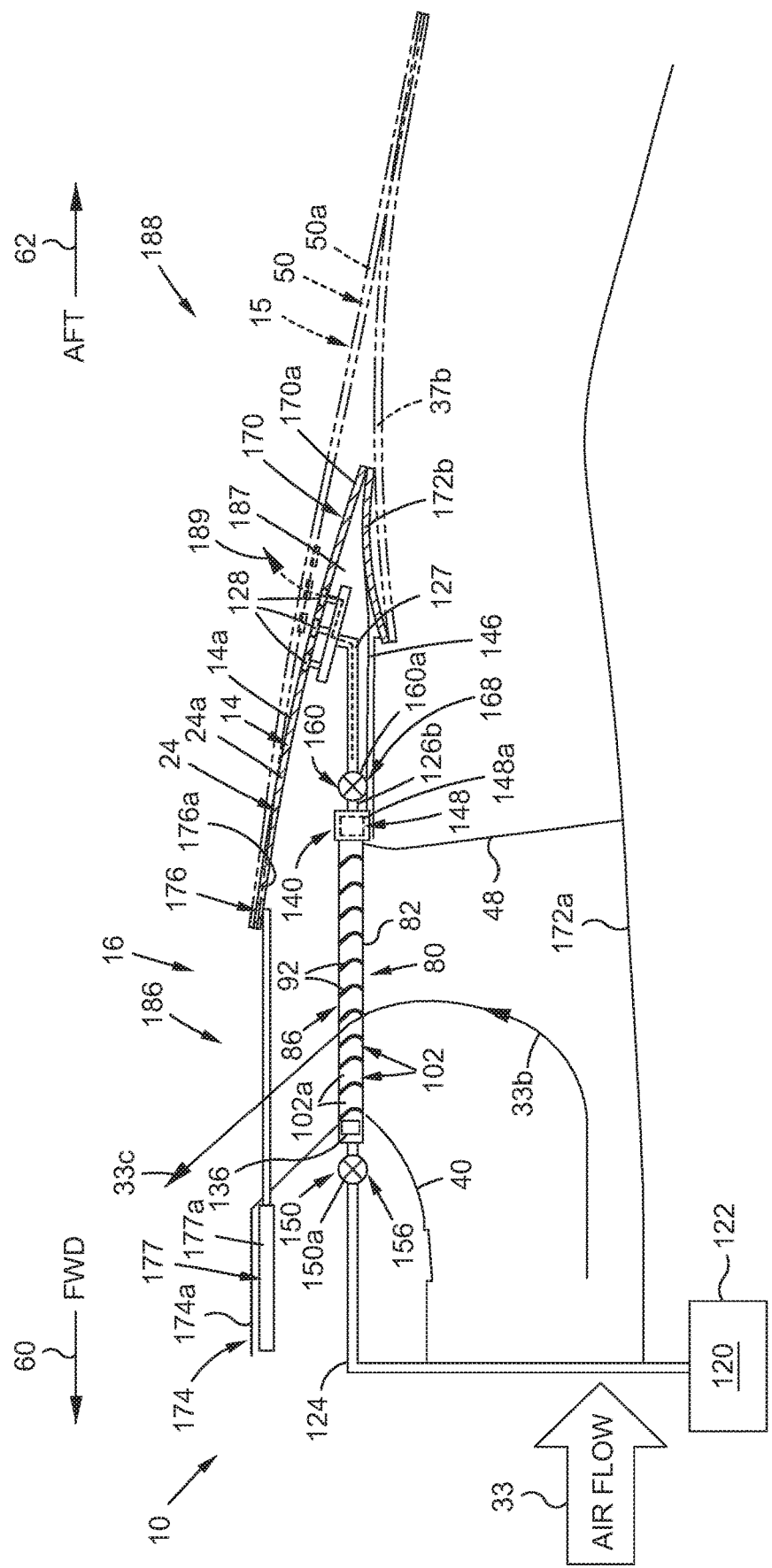
FIG. 9D is an illustration of a partial sectional side view of the inflatable cascade system of FIG. 9A in a deployed position prior to thrust reverser stowing stage.

Now referring to FIG. 9D, FIG. 9D is an illustration of a partial sectional side view of the inflatable cascade system 10 of FIG. 9A for the engine 16, in a deployed position prior to thrust reverser stowing stage 188. In this deployed position prior to thrust reverser stowing stage 188 (see FIG. 9D), the forward flow valve 150 (see FIG. 9D), such as in the form of the electronic flow control valve 150a (see FIG. 9D), is now closed and in the closed position 156, so that no additional pressurized fluid 120 (see FIG. 9D) from the pressurized fluid supply system 122 (see FIG. 9D) can flow through the supply ducts 124 (see FIG. 9D), into and through the forward flow valve 150, through the plenum chamber 136, and into the inflatable cascade assembly 80.

In addition, in this deployed position prior to thrust reverser stowing stage 188 (see FIG. 9D), the aft flow valve 160 (see FIG. 9D), such as in the form of the electronic flow control valve 160a (see FIG. 9D), is now opened and in an open position 168 (see FIG. 9D). As shown in FIG. 9D, with the aft flow valve 160 in the open position 168, the trapped fluid 189, or deflated pressurized fluid or deflated air, in the inflatable cascade assembly 80 comprising the inflatable cascade member 82, flows out of the inflatable cascade assembly 80, through the outlet ducts 126b, through the aft flow valve 160, which is now open, and is vented through the vent ducts 127 disposed in a cavity 187 of the reduced length translating sleeve 170a, and is vented out of the engine 16. The trapped fluid 189 (see FIG. 9D), or deflated pressurized fluid or deflated air, may be vented out of cavity 187 and out of the pressure relief vents 128 (see FIG. 9D) in the nacelle 14 (see FIG. 9D) to relieve the pressure inside the cavity 187 (see FIG. 9D) during taxiing of the aircraft 12a (see FIG. 1) on the runway.

In addition, in this deployed position prior to thrust reverser stowing stage 188 (see FIG. 9D), the translating aft cascade support ring 140 (see FIG. 9D) begins translating or sliding via the translating apparatus 148 (see FIG. 9D), such as the slider apparatus 148a (see FIG. 9D), back toward the stowed position at forward thrust stage 180 (see FIG. 9A). In this deployed position prior to thrust reverser stowing stage 188 (see FIG. 9D), the blocker doors 48 (see FIG. 9D) are still in the deployed position before going back to being stowed in the blocker door storage area 146 (see FIG. 9D).

FIG. 9D further shows the nacelle 14, such as the shortened nacelle 14a, comprising the reduced length translating portion 170, such as the reduced length translating sleeve 170a, which is actuated or deployed via the thrust reverser actuators 177, such as hydraulic actuators 177a. FIG. 9D further shows the fixed portion 174 (see FIG. 9C), such as the inlet cowl 174a (see FIG. 9C), of the nacelle 14.

As discussed above, the inflatable cascade system 10 (see FIG. 9D) with the inflatable cascade assembly 80 (see FIG. 9D) comprising the inflatable cascade member 82 (see FIG. 9D), significantly reduces the length of the nacelle 14 (see FIG. 9D), and the reduced length translating portion 170 (see FIG. 9D), such as the reduced length translating sleeve 170a (see FIG. 9C), is shorter in length, as compared to the longer known nacelle 15 (see FIG. 9D) and the longer known translating portion 50 (see FIG. 9D), such as the longer known translating sleeve 50a (see FIG. 9D), of the known nacelle 15.

The cascade thrust reverser system 24 (see FIG. 9D), such as the inflatable cascade thrust reverser system 24*a* (see FIG. 9D), having the cascade thrust reverser 176 (see FIG. 9C), such as the inflatable cascade thrust reverser 176*a* (see FIG. 9D), is still shown in the deployed reverse thrust mode 186 (see FIG. 9D). FIG. 9D further shows the fan duct inner wall 172*a* and the shortened fan duct outer wall 172*b*, as compared to the longer known fan duct outer wall 37*b*. In FIG. 9D, the air flow 33, such as in the form of fan air flow 33*b*, cannot flow past the blocker doors 48 which are still deployed, and is diverted or deflected past the thrust reverser bullnose fairing 40, and through the plurality of circumferential vanes 92 and the plurality of inflatable support members 102, such as the plurality of strongbacks 102*a*, of the inflatable cascade assembly 80. As shown in FIG. 9D, the inflatable cascade assembly 80 is still in the deployed inflated state 86. The fan air flow 33*b* (see FIG. 9D) flows through the inflatable cascade assembly 80 (see FIG. 9D), which turns the fan air flow 33*b* as it exits out of the engine 16 (see FIG. 9D) to become the reverse efflux air flow 33*c* (see FIG. 9D) which flows out in a generally forward direction 60 (see FIG. 9D) and generates the thrust reverser effect.

Succeeding the thrust reverser operation, and at the deployed position prior to thrust reverser stowing stage 188 (see FIG. 9D), the forward flow valve 150 (see FIG. 9D) closes and the aft flow valve 160 (see FIG. 9D) opens to release the trapped fluid 189 (see FIG. 9D), such as trapped pressurized air, from the inflated inflatable cascade assembly 80 (see FIG. 9D) comprising the inflated inflatable cascade member 82 (see FIG. 9D).

Once all of the trapped fluid 189 (see FIG. 9D) flows out of the inflatable cascade assembly 80 (see FIG. 9D), the aft flow valve 160 may be closed back to the closed position 166 (see FIG. 9A), and the inflatable cascade assembly 80 may be moved from the aft direction 62 (see FIG. 9D) to the forward direction 60 (see FIG. 9D), via the translating aft cascade support ring 140 (see FIG. 9D) and the translating apparatus 148 (see FIG. 9D), and back to the stowed position at forward thrust stage 180 (see FIG. 9A). In addition, the reduced length translating portion 170 (see FIG. 9D), such as the reduced length translating sleeve 170*a* (see FIG. 9D), may be moved from the aft direction 62 (see FIG. 9D) to the forward direction 60 (see FIG. 9D), via the thrust reverser actuators 177 (see FIG. 9D), such as the hydraulic actuators 177*a*, and back to the stowed position at forward thrust stage 180 (see FIG. 9A). In addition, the cascade thrust reverser 176, such as the inflatable cascade thrust reverser 176*a*, may be moved from the aft direction 62 (see FIG. 9D) to the forward direction 60 (see FIG. 9D), and back to the stowed forward thrust mode 181 (see FIG. 9A). In addition, the blocker doors 48 (see FIG. 9D) may be moved or deployed via a drag-link mechanism or another suitable deployment mechanism or apparatus back into the blocker door storage area 146 (see FIG. 9D), and back to the stowed position at forward thrust stage 180 (see FIG. 9A).

During this stowing transition from 100% deployed to 0% deployed, the translating aft cascade support ring 140 (see FIG. 9D) starts sliding again to its stowed position. Meanwhile, the trapped fluid 189 (see FIG. 9D) continues to escape from the inflated inflatable cascade assembly 80 (see FIG. 9D) comprising the inflated inflatable cascade member 82 (see FIG. 9D), via the open aft flow valve 160 (see FIG. 9D). This escaped trapped fluid 189 (see FIG. 9D) flows into the cavity 187 (see FIG. 9D) of the reduced length translating sleeve 170*a* (see FIG. 9D) and then exits the cavity 187 (see FIG. 9D) via the pressure relief vents 128 (see FIG. 9D) located on the external translating sleeve (one pressure relief vent per translating sleeve).

At the end, the cascade thrust reverser 176 (see FIG. 9A) is again back at the stowed position at forward thrust stage 180 (see FIG. 9A) and regains its stowed forward thrust mode 181 (see FIG. 9A), i.e., 0% stowed position, where the inflatable cascade assembly 80 (see FIG. 9A) comprising the inflated inflatable cascade member 82 (see FIG. 9A) is again back in the stowed deflated state 84 (see FIG. 9A), and the cascades are fully flat. The blocker doors 48 (see FIG. 9A) and the reduced length translating sleeve 170*a* (see FIG. 9A) are also transitioned to their respective fully stowed positions.

Figure 10:
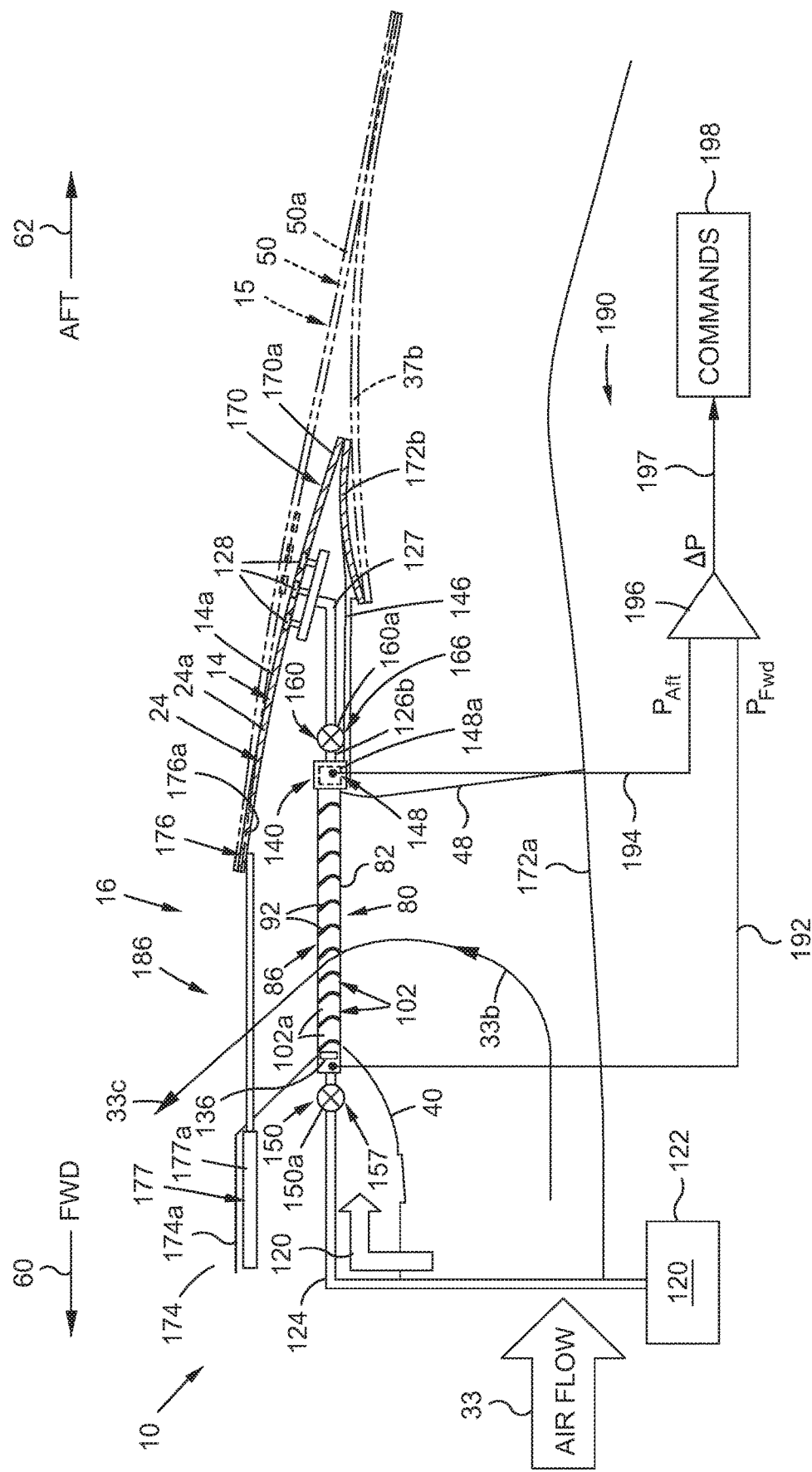
FIG. 10 is an illustration of a partial sectional side view of the inflatable cascade system of FIG. 9C, showing a disclosed example of one or more safety devices used with the inflatable cascade system.

Now referring to FIG. 10, FIG. 10 is an illustration of a partial sectional side view of the inflatable cascade system 10 of FIG. 9C, in the deployed reverse thrust mode 186, showing a disclosed example of one or more safety devices 190 that may be used with the inflatable cascade system 10. The one or more safety devices 190 (see FIGS. 4, 10) preferably comprise one or more pressure sensors 190*a* (see FIG. 4) configured to signal one or more of, an air leakage 191*a* (see FIG. 4) in the inflatable cascade system 10, a cascade breach 191*b* (see FIG. 4) of one or more of the plurality of inflatable cascade members 82 (see FIGS. 4, 10), or another safety issue. The safety devices 190 (see FIG. 4) may further comprise transducers, electrical signals, alarms, or other safety devices or safety notification devices.

As shown in FIG. 10, in the deployed reverse thrust mode 186, a delta pressure 196 (ΔP) may be constantly measured across a forward flow pressure 192 ($P_{Fwd}$) from the forward flow valve 150, such as the electronic flow control valve 150*a*, and an aft flow pressure 194 ($P_{Aft}$) from the aft flow valve 160, such as the electronic flow control valve 160*a*. As further shown in FIG. 10, if any leakage, such as air leakage 191*a* (see FIG. 4), is detected, for example, there is a drop or decrease in the delta pressure 196 (ΔP) and/or the delta pressure 196 (ΔP) is less than a calibrated value of pressure, then an electronic signal 197 preferably triggers one or more commands 198 to stow the cascade thrust reverser 176, such as the inflatable cascade thrust reverser 176*a*, and to stow other structures or components of the engine 16. The safety devices 190 are commands 198 are discussed in further detail below with respect to FIG. 11.

In addition, during the stowed forward thrust mode 181 (see FIG. 9A), to eliminate or minimize any unwanted inflation 191*c* (see FIG. 4), or pressurization, due to any possible issues or problems with the forward flow valve 150 (see FIGS. 9A, 10), the aft flow valve 160 (see FIGS. 9A, 9D, 10) may be kept open in the open position 168 (see FIG. 9D).

FIG. 10 further shows the fully deployed position at reverse thrust stage 184 of FIG. 9C with the forward flow valve 150 in the semi-open position 157, so that the pressurized fluid 120 from the pressurized fluid supply system 122 can still flow through the supply ducts 124, through the forward flow valve 150, and into the inflatable cascade assembly 80, and with the aft flow valve 160 in the closed position 166. FIG. 10 further shows the nacelle 14, such as the shortened nacelle 14*a*, comprising the reduced length translating portion 170, such as the reduced length translating sleeve 170*a*, which is actuated or deployed via the thrust reverser actuators 177, such as hydraulic actuators 177*a*. FIG. 10 further shows the fixed portion 174, such as the inlet cowl 174*a*, of the nacelle 14, the cascade thrust reverser 176, such as the inflatable cascade thrust reverser 176*a*, the fan duct inner wall 172*a* and the shortened fan duct outer wall 172*b*, as compared to the longer known fan duct outer wall 37b, and further shows the air flow 33, such as in the form of fan air flow 33b being blocked by the blocker doors 48 and diverted or deflected past the thrust reverser bullnose fairing 40, and through the plurality of circumferential vanes 92 and the plurality of inflatable support members 102, such as the plurality of strongbacks 102a, of the inflatable cascade assembly 80. As shown in FIG. 10, the inflatable cascade assembly 80 is in the deployed inflated state 86, and the fan air flow 33b flows through the inflatable cascade assembly 80, which turns the fan air flow 33b as it exits out of the engine 16 to become the reverse efflux air flow 33c which flows out in the generally forward direction 60 and generates the thrust reverser effect. As discussed above the reduced length translating portion 170 (see FIG. 10), such as the reduced length translating sleeve 170a (see FIG. 10), is shorter in length, as compared to the longer known nacelle 15 (see FIG. 10) and the longer known translating portion 50 (see FIG. 10), such as the longer known translating sleeve 50a (see FIG. 10), of the known nacelle 15.

Figure 11:
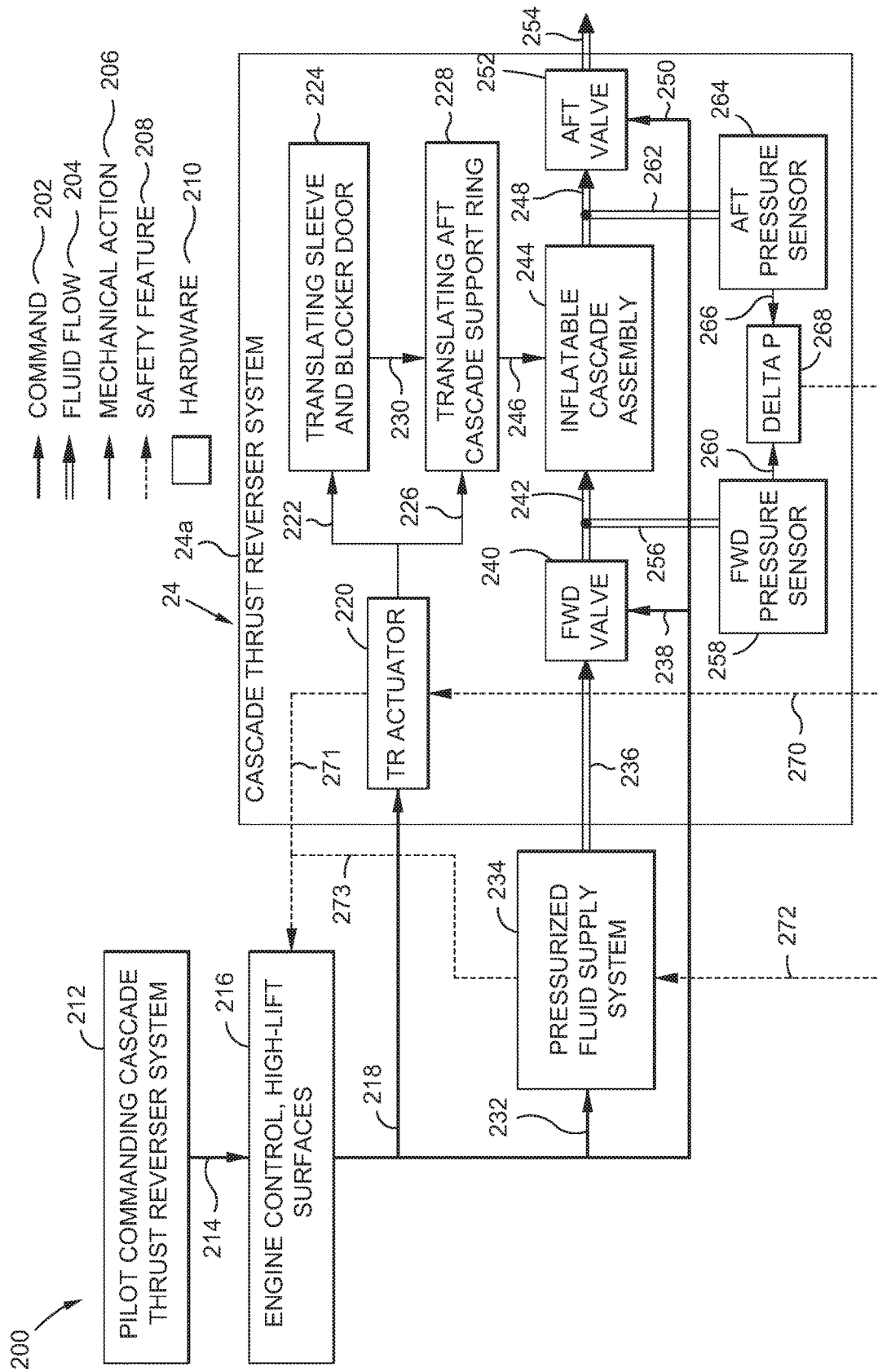
FIG. 11 is an illustration of a schematic flow diagram for a disclosed example of a cascade thrust reverser system with inflatable cascade system command and hardware scheme.

Now referring to FIG. 11, FIG. 11 is an illustration of a schematic flow diagram for a disclosed example of an inflatable cascade system command and hardware scheme 200 for a cascade thrust reverser system 24, such as an inflatable cascade thrust reverser system 24a. FIG. 11 shows a command indicator 202, a pressurized fluid flow indicator 204, a mechanical action indicator 206, a safety feature indicator 208, and a hardware indicator 210 for the inflatable cascade system command and hardware scheme 200.

As shown in FIG. 11, the inflatable cascade system command and hardware scheme 200 starts with a pilot or user using a command hardware 212 to issue a deploy or stow control command 214 for commanding the cascade thrust reverser system 24, such as the inflatable cascade thrust reverser system 24. When the deploy or stow control command 214 (see FIG. 11) is made, hardware 216 (see FIG. 11) is activated, such as for control of the engine 16 (see FIGS. 1, 4), control of high-lift surfaces of the aircraft 12a (see FIGS. 1, 4), or other aircraft controls pertinent to the thrust reverser actuators 177 (see FIGS. 4, 9A), the cascade thrust reverser 176 (see FIGS. 4, 9A), such as the inflatable cascade thrust reverser 176a (see FIGS. 4, 9A), the inflatable cascade assembly 80 (see FIGS. 4, 9A-9D), and the inflatable cascade members 82 (see FIGS. 4, 9A-9D).

As further shown in FIG. 11, a power and control command 218 is issued to a thrust reverser actuator hardware 220 to provide power and control to deploy (or stow) the thrust reverser actuators 177 (see FIGS. 3, 9A). As further shown in FIG. 11, a translating sleeve and blocker door command 222 is made to a translating sleeve and blocker door hardware 224 to deploy or stow the reduced length translating sleeve 170a (see FIGS. 3, 9A-9D) and the blocker doors 48 (see FIGS. 9A-9D).

As further shown in FIG. 11, a translating aft cascade support ring command 226 is made to a translating aft cascade support ring hardware 228 to deploy or stow the translating aft cascade support ring 140 (see FIGS. 3, 9A), by moving or sliding the translating aft cascade support ring 140 (see FIGS. 3, 9A) with the translating apparatus 148 (see FIGS. 3, 9A), such as the slider apparatus 148a (see FIGS. 3, 9A-9D). Preferably, the translating sleeve and blocker door hardware 224 (see FIG. 11) is activated first, and then a successive command 230 (see FIG. 11), such as the translating aft cascade support ring command 226 (see FIG. 11) is made and the translating aft cascade support ring hardware 228 (see FIG. 11) is activated.

Once the translating sleeve and blocker door hardware 224 (see FIG. 11) and the translating aft cascade support ring hardware 228 (see FIG. 11) are activated, the inflatable cascade assembly 80 (see FIGS. 4, 9A-9D) is inflated by commanding with a pressurized fluid supply system command 232 (see FIG. 11) a pressurized fluid supply system hardware 234 (see FIG. 11) to release a pressurized fluid flow 236 (see FIG. 11), and a forward flow valve command 238 (see FIG. 11) is made to a forward flow valve hardware 240 to open the forward flow valve 150 (see FIGS. 4, 9B) to an open position 158 (see FIG. 9B).

As further shown in FIG. 11, once the forward flow valve 150 (see FIGS. 4, 9B) is in the open position 158 (see FIG. 9B), pressurized fluid 120 (see FIGS. 4, 9B) flows as forward flow valve pressurized fluid flow 236 from the pressurized fluid supply system hardware 234, such as the pressurized fluid supply system 122 (see FIGS. 4, 9B), to the forward flow valve hardware 240, such as the forward flow valve 150 (see FIGS. 4, 9B), and then flows as inflatable cascade assembly pressurized fluid flow 242 from the forward flow valve hardware 240, such as the forward flow valve 150 (see FIGS. 4, 9B), to an inflatable cascade assembly hardware 244, such as in the form of the inflatable cascade assembly 80 (see FIGS. 4, 9B) comprising the inflatable cascade member 82 (see FIGS. 4, 9B).

Preferably, the translating sleeve and blocker door hardware 224 (see FIG. 11) and the translating aft cascade support ring hardware 228 (see FIG. 11) are activated, and then one or more commands 246, that may be successive or simultaneous, such as the pressurized fluid supply system command 232 and the forward flow valve command 238, may be made, and the inflatable cascade assembly hardware 244 (see FIG. 11) is activated. After the inflatable cascade assembly 80 (see FIGS. 4, 9C) is fully deployed and after the cascade thrust reverser system 24, such as the inflatable cascade thrust reverser system 24a, has undergone the reverse thrust operation, the forward flow valve command 238 (see FIG. 11) is made to the forward flow valve hardware 240 (see FIG. 11) to close the forward flow valve 150 (see FIGS. 4, 9A, 9D) to the closed position 156 (see FIGS. 9A, 9D), and an aft flow valve command 250 (see FIG. 11) is made to an aft flow valve hardware 252 (see FIG. 11) to open the aft flow valve 160 (see FIGS. 4, 9D) to an open position 168 (see FIG. 9D), to release a trapped pressurized fluid flow 254 (see FIG. 11) from the inflatable cascade assembly 80 (see FIG. 9D), and vent the trapped pressurized fluid flow 254 (see FIG. 11) out of the cascade thrust reverser system 24, such as an inflatable cascade thrust reverser system 24a.

As further shown in FIG. 11, the inflatable cascade system command and hardware scheme 200 shows the safety feature, as discussed above with regard to FIG. 10, of a forward pressure sensor hardware 258 which measures a forward pressure sensor pressurized fluid flow 256 from the forward flow valve 150 (see FIGS. 4, 9C), and an aft pressure sensor hardware 264 which measures an aft pressure sensor pressurized fluid flow 262 from the aft flow valve 160 (see FIGS. 4, 9C). As further shown in FIG. 11, a delta pressure measurement hardware 268 is constantly measured across the forward flow valve 150 (see FIGS. 4, 9C) and the aft flow valve 160 (see FIGS. 4, 9C), via a forward pressure sensor signal 260 and an aft pressure sensor signal 266. If any pressurized fluid leakage, such as air leakage 191a (see FIG. 4), is detected, for example, there is a drop in pressure, an electronic signal 197 (see FIG. 10) is generated and triggers one or more commands 198 (see FIG. 10), such as a safety feature thrust reverser stow command 270, to stow the thrust reverser actuator hardware 220, such as the thrust reverser actuators 177 (see FIGS. 3, 9A), and triggers a first safety feature engine and high-lift surfaces stow command 271 (see FIG. 11) to stow the hardware 216 (see FIG. 11).

As further shown in FIG. 11, if any pressurized fluid leakage, such as air leakage 191a (see FIG. 4), is detected, for example, there is a drop in pressure, the electronic signal 197 (see FIG. 10) is generated and may trigger a safety feature pressurized fluid supply system stop command 272 to the pressurized fluid supply system hardware 234 to stop the forward flow valve pressurized fluid flow 236 from the pressurized fluid supply system hardware 234, such as the pressurized fluid supply system 122 (see FIGS. 4, 9C), and triggers a second safety feature engine and high-lift surfaces stow command 273 to stow the hardware 216.

Figure 12:
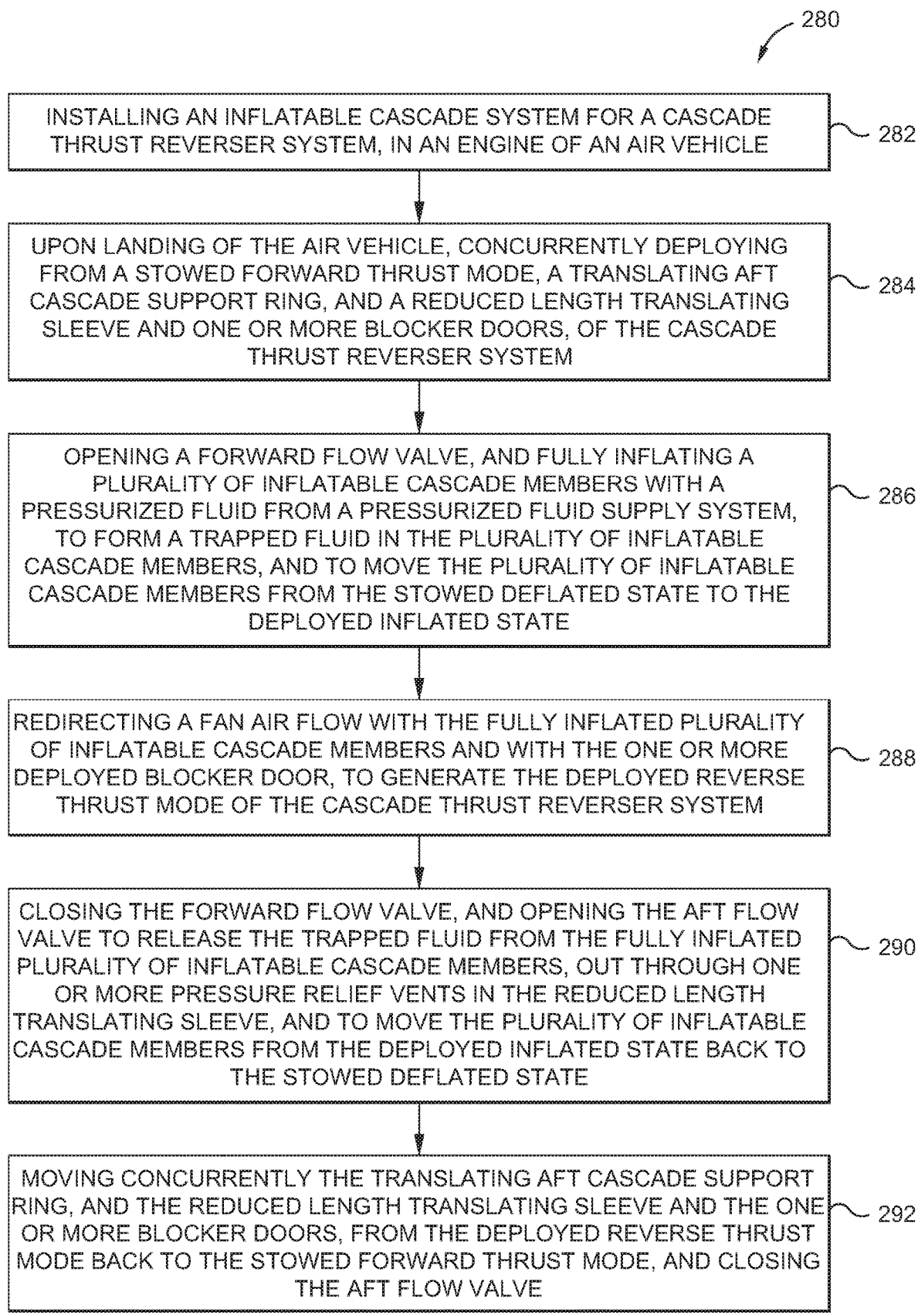
FIG. 12 is an illustration of a flow diagram showing a disclosed example of a method.

Now referring to FIG. 12, in another disclosed example, there is provided a method 280 of using an inflatable cascade system 10 (see FIGS. 4, 9A-9D) for a cascade thrust reverser system 24 (see FIGS. 4, 9A-9D) in an engine 16 (see FIGS. 1, 4) of an air vehicle 12 (see FIGS. 1, 4), to provide a reduced aerodynamic drag 274 (see FIG. 4) of the engine 16 (see FIG. 4) and to provide an increased fan nozzle efficiency 277 (see FIG. 4) of the engine 16 (see FIG. 4), as well as an increased fan duct efficiency 276 (see FIG. 4). FIG. 12 is an illustration of a flow diagram showing a disclosed example of the method 280.

As shown in FIG. 12, the method 280 comprises step 282 of installing the inflatable cascade system 10 (see FIGS. 4, 9A-9D) for the cascade thrust reverser system 24 (see FIGS. 4, 9A-9D), such as the inflatable cascade thrust reverser system 24a (see FIGS. 4, 9A-9D), in the engine 16 (see FIGS. 4, 9A-9D) of the air vehicle 12 (see FIGS. 1, 4). As discussed in detail above, the inflatable cascade system 10 (see FIGS. 4, 9A-9D) comprises the inflatable cascade assembly 80 (see FIGS. 4, 9A-9D) coupled to the fixed portion 174 (see FIGS. 4, 9A-9D) of the nacelle 14 (see FIGS. 4, 9A-9D), such as the shortened nacelle 14a (see FIGS. 4, 9A-9D) of the engine 16. The inflatable cascade assembly 80 comprises a plurality of inflatable cascade members 82 (see FIGS. 4, 9A-9D) movable between a stowed deflated state 84 (see FIGS. 4, 6A), when the cascade thrust reverser system 24 (see FIGS. 4, 9A-9D) is in a stowed forward thrust mode 181 (see FIGS. 9A-9B), and a deployed inflated state 86 (see FIGS. 4, 5A), when the cascade thrust reverser system 24 is in a deployed reverse thrust mode 186 (see FIGS. 9C-9D).

As shown in FIG. 5A, each inflatable cascade member 82 comprises the forward end 88a, the aft end 88b, and the body 90 formed between the forward end 88a and the aft end 88b. The inflatable cascade system 10 (see FIGS. 4, 9A-9D) further comprises the forward flow valve 150, such as in the form of an electronic flow control valve 150a (see FIGS. 4, 9A-9D), coupled to the forward end 88a (see FIG. 9A).

The inflatable cascade system 10 (see FIGS. 4, 9A-9D) further comprises the pressurized fluid supply system 122 (see FIGS. 4, 9A-9D) coupled to the forward flow valve 150 (see FIGS. 4, 9A-9D). The pressurized fluid supply system 122 (see FIGS. 4, 9A-9D) provides pressurized fluid 120 (see FIGS. 4, 9A-9D) to the plurality of inflatable cascade members 82 (see FIGS. 4, 9A-9D), via the forward flow valve 150 (see FIGS. 4, 9A-9D), to inflate the plurality of inflatable cascade members 82.

The inflatable cascade system 10 (see FIGS. 4, 9A-9D) further comprises a translating aft cascade support ring 140 (see FIGS. 4, 9A-9D) coupled at the aft end 88b (see FIGS. 5A, 9A). The inflatable cascade system 10 (see FIGS. 4, 9A-9D) further comprises an aft flow valve 160 (see FIG. 9A) coupled to the aft end 88b (see FIG. 9A).

The step 282 (see FIG. 12) of installing the inflatable cascade system 10 (see FIGS. 4, 9A-9D) in the engine 16 of the air vehicle 12 further comprises installing the inflatable cascade assembly 80 further comprising a plenum chamber 136 coupled at the forward end 88a of each inflatable cascade member 82, to distribute the pressurized fluid 120 uniformly within each inflatable cascade member 82. The pressurized fluid 120 (see FIGS. 4, 9A-9D) may comprise one of, pressurized air 120a (see FIG. 4), engine compressor bleed air 120b (see FIG. 4), compressed air 120c (see FIG. 4), hydraulic fluid 120d (see FIG. 4), ram air 120e (see FIG. 4), or another suitable pressurized fluid 120 (see FIG. 4).

The step 282 (see FIG. 12) of installing the inflatable cascade system 10 (see FIGS. 4, 9A-9D) in the engine 16 (see FIGS. 1, 4) of the air vehicle 12 (see FIGS. 1, 4) further comprises installing one or more safety devices 190 (see FIGS. 4, 10). The safety devices 190 (see FIGS. 4, 10) preferably comprise one or more pressure sensors 190a (see FIG. 4) configured to signal one or more of, an air leakage 191a (see FIG. 4) in the inflatable cascade system 10, a cascade breach 191b (see FIG. 4) of one or more of the plurality of inflatable cascade members 82 (see FIG. 4), or another safety issue. The safety devices 190 (see FIGS. 4, 10) may further comprise transducers, electrical signals, alarms, or other suitable safety devices or safety notification devices.

The step 282 (see FIG. 12) of installing the inflatable cascade system 10 (see FIGS. 4, 9A-9D) in the engine 16 (see FIGS. 1, 4) of the air vehicle 12 (see FIGS. 1, 4) further comprises installing the inflatable cascade assembly 80 (see FIGS. 4, 9A), wherein the translating aft cascade support ring 140 (see FIGS. 4, 9A) is coupled to a translating apparatus 148 (see FIGS. 4, 9A) configured to move the translating aft cascade support ring 140, which, in turn, is configured to move the plurality of inflatable cascade members 82 (see FIGS. 4, 9A) between the stowed deflated state 84 (see FIGS. 4, 6A, 9A) and the deployed inflated state 86 (see FIGS. 4, 5A, 9C), to elongate with deployment and shorten with stowing the plurality of inflatable cascade members 82 (see FIGS. 4, 5A, 6A, 9A, 9C).

The step 282 (see FIG. 2) of installing the inflatable cascade system 10 (see FIGS. 4, 9A-9D) in the engine 16 (see FIGS. 1, 4) of the air vehicle 12 (see FIGS. 1, 4) further comprises installing the inflatable cascade assembly 80 (see FIG. 4), wherein each of the plurality of inflatable cascade members 82 (see FIGS. 4, 9A) has a stowed length 85 (see FIGS. 4, 6A), when in the stowed deflated state 84 (see FIGS. 4, 6A), that is about 15% (fifteen percent) to about 25% (twenty-five percent) of a total deployed length 87 (see FIGS. 4, 5A) of the inflatable cascade member 82 (see FIGS. 4, 5A), when the inflatable cascade member 82 is in the deployed inflated state 86 (see FIGS. 4, 5A).

As shown in FIG. 12, the method 280 further comprises step 284 of, upon landing or touchdown on the ground surface, such as a runway of an airport, by the air vehicle 12 (see FIGS. 1, 4), concurrently deploying from the stowed forward thrust mode 181 (see FIG. 9A), the translating aft cascade support ring 140 (see FIG. 9A), and the reduced length translating sleeve 170a (see FIG. 9A) and one or more blocker doors 48 (see FIG. 9A), of the cascade thrust reverser system 24 (see FIG. 9A).

As shown in FIG. 12, the method 280 further comprises step 286 of opening the forward flow valve 150 (see FIG. 9B) in the open position 158 (see FIG. 9B), and fully inflating the plurality of inflatable cascade members 82 (see FIG. 9C) with the pressurized fluid 120 (see FIG. 9C) from the pressurized fluid supply system 122 (see FIG. 9C), to form a trapped fluid 189 (see FIG. 9C) in the plurality of inflatable cascade members 82 (see FIG. 9C), and to move the plurality of inflatable cascade members 82 from the stowed deflated state 84 (see FIG. 9B) to the deployed inflated state 86 (see FIG. 9C).

The step 286 (see FIG. 12) of opening the forward flow valve 150 (see FIG. 9C) and fully inflating the plurality of inflatable cascade members 82 (see FIG. 9C) with the pressurized fluid 120 (see FIG. 9C) from the pressurized fluid supply system 122 (see FIG. 9C), comprises fully inflating the plurality of inflatable cascade members 82 (see FIG. 9C) with the pressurized fluid 120 (see FIG. 9C) comprising one of, pressurized air 120a (see FIG. 4), engine compressor bleed air 120b (see FIG. 4), compressed air 120c (see FIG. 4), hydraulic fluid 120d (see FIG. 4), ram air 120e (see FIG. 4), or another suitable pressurized fluid 120 (see FIG. 4).

As shown in FIG. 12, the method 280 further comprises step 288 of redirecting the fan air flow 33b (see FIG. 9C) with the fully inflated plurality of inflatable cascade members 82 (see FIG. 9C) and with the one or more deployed blocker doors 48 (see FIG. 9C), to generate the deployed reverse thrust mode 186 (see FIG. 9C) of the cascade thrust reverser system 24 (see FIG. 9C). The plurality of inflatable cascade members 82 (see FIG. 9C) in the deployed inflated state 86 (see FIG. 9C) redirect and divert the fan air flow 33b (see FIG. 9C) out of the engine 16 (see FIG. 9C), as reverse efflux air flow 33c (see FIG. 3C) to generate reverse thrust.

As shown in FIG. 12, the method 280 further comprises step 290 of closing the forward flow valve 150 (see FIG. 9D) so that it is in the closed position 156 (see FIG. 9D), and opening the aft flow valve 160 (see FIG. 9D), so that it is in the open position 168 (see FIG. 9D), to release the trapped fluid 189 (see FIG. 9D) from the fully inflated plurality of inflatable cascade members 82 (see FIG. 9D), out through one or more pressure relief vents 128 (see FIG. 9D) in cavity 187 (see FIG. 9D) of the reduced length translating sleeve 170a (see FIG. 9D), and to move the plurality of inflatable cascade members 82 from the deployed inflated state 86 (see FIG. 9D) back to the stowed deflated state 84 (see FIG. 9A).

As shown in FIG. 12, the method 280 further comprises step 292 of moving concurrently the translating aft cascade support ring 140 (see FIG. 9A), and the reduced length translating sleeve 170a (see FIG. 9A) and the one or more blocker doors 48 (see FIG. 9A), from the deployed reverse thrust mode 186 (see FIG. 9D) back to the stowed forward thrust mode 181 (see FIG. 9A), and closing the aft flow valve 160 (see FIG. 9A) back to the closed position 166 (see FIG. 9A).

Figure 13:
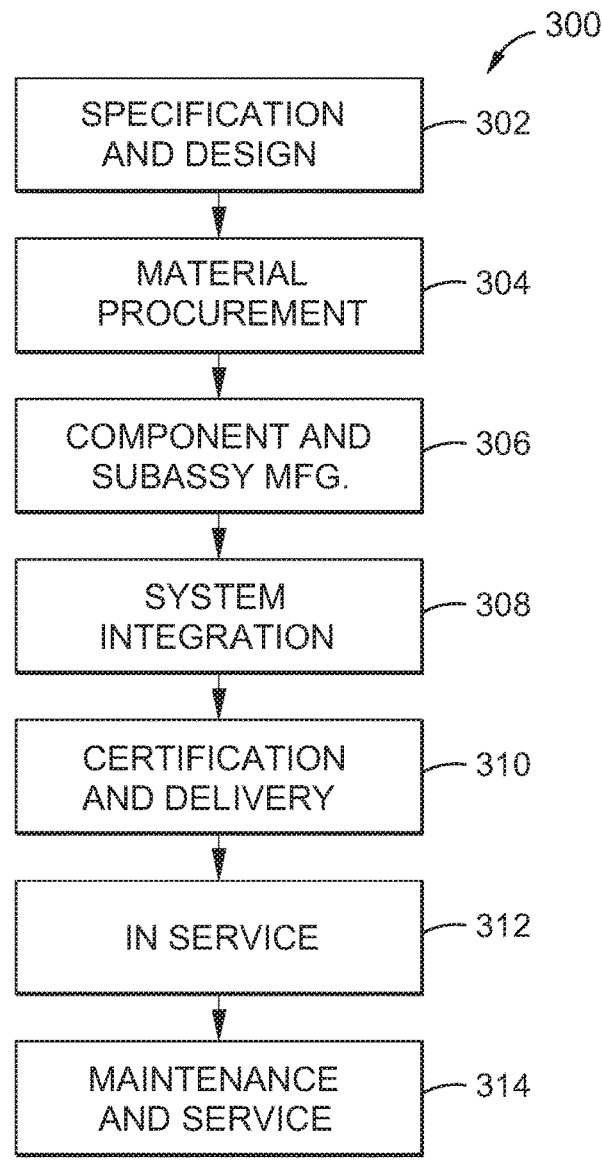
FIG. 13 is an illustration of a flow diagram of an aircraft manufacturing and service method.
Figure 14:
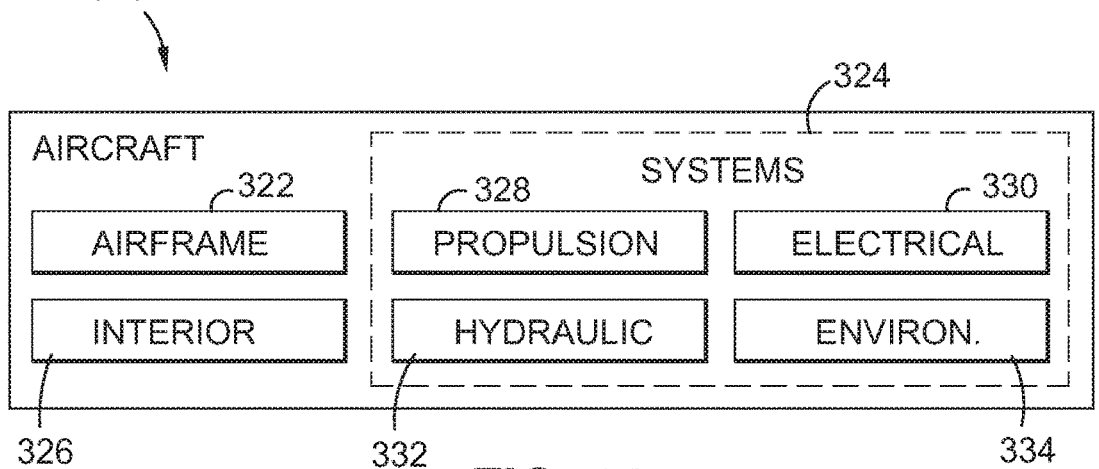
FIG. 14 is an illustration of a functional block diagram of an aircraft.

FIG. 13 is an illustration of a flow diagram of an aircraft manufacturing and service method 300. FIG. 14 is an illustration of a functional block diagram of an aircraft 320. Referring to FIGS. 13-14, examples of the disclosure may be described in the context of the aircraft manufacturing and service method 300 as shown in FIG. 13, and the aircraft 320 as shown in FIG. 14.

As shown in FIG. 13, during pre-production, exemplary aircraft manufacturing and service method 300 may include specification and design 302 of the aircraft 320 and material procurement 304. As further shown in FIG. 13, during manufacturing, component and subassembly manufacturing 306 and system integration 308 of the aircraft 320 takes place. Thereafter, the aircraft 320 may go through certification and delivery 310 (see FIG. 13) in order to be placed in service 312 (see FIG. 13). While in service 312 (see FIG. 13) by a customer, the aircraft 320 (see FIG. 14) may be scheduled for routine maintenance and service 314 (see FIG. 13) (which may also include modification, reconfiguration, refurbishment, and other suitable services).

Each of the processes of the aircraft manufacturing and service method 300 (see FIG. 13) may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 14, the aircraft 320 produced by the exemplary aircraft manufacturing and service method 300 may include an airframe 322 with a plurality of systems 324 and an interior 326. Examples of the plurality of systems 324 may include one or more of a propulsion system 328 (see FIG. 14), an electrical system 330 (see FIG. 14), a hydraulic system 332 (see FIG. 14), and an environmental system 334 (see FIG. 14). Any number of other systems may be included. Although an aerospace example is shown, the principles of the disclosure may be applied to other industries, such as the automotive industry.

Methods and systems embodied herein may be employed during any one or more of the stages of the aircraft manufacturing and service method 300 (see FIG. 13). For example, components or subassemblies corresponding to component and subassembly manufacturing 306 (see FIG. 13) may be fabricated or manufactured in a manner similar to components or subassemblies produced while the aircraft 320 (see FIG. 14) is in service 312 (see FIG. 13). Also, one or more apparatus examples, method examples, or a combination thereof, may be utilized during component and subassembly manufacturing 306 (see FIG. 13) and system integration 308 (see FIG. 13), for example, by substantially expediting assembly of or reducing the cost of the aircraft 320 (see FIG. 14). Similarly, one or more of apparatus examples, method examples, or a combination thereof, may be utilized while the aircraft 320 (see FIG. 14) is in service 312 (see FIG. 13), for example and without limitation, to maintenance and service 314 (see FIG. 13).

Examples of the inflatable cascade system 10 (see FIGS. 4, 9A-9D) with the inflatable cascade assembly 80 (see FIGS. 4, 9A-9D) for the cascade thrust reverser system 24 (see FIGS. 4, 9A-9D), such as the inflatable cascade thrust reverser system 24a (see FIGS. 4, 9A-9D), and the method 280 (see FIG. 12) use the inflatable cascade assembly 80 (see FIGS. 4, 9A-9D), use the translating aft cascade support ring 140 (see FIGS. 4, 9A-9D) with the translating apparatus 148 (see FIGS. 4, 9A-9D), such as the sliding apparatus 148a (see FIGS. 4, 9A-9D), and use the pressurized fluid supply system 122 (see FIGS. 4, 9A-9D) with the pressurized fluid 120 (see FIG. 4), such as the engine compressor bleed air 120b (see FIG. 4), or another suitable pressurized fluid 120, and the supply ducts 124 (see FIG. 9A), the inlet ducts 126a (see FIG. 9A), and the outlet ducts 126b (see FIG. 9A). Upon, or at, landing, the inflatable cascade assembly 80 (see FIGS. 4, 9A-9D), which is in the stowed deflated state 84 (see FIG. 6A), is inflated with the pressurized fluid 120 (see FIGS. 4, 9C-9D), such as the engine compressor bleed air 120b (see FIG. 4), or another suitable pressurized fluid 120, to form the shape of the fully deployed and inflated inflatable cascade assembly 80 in the deployed inflated state 86 (see FIG. 9C). After deployment, the trapped fluid 189 (see FIG. 9D), such as the trapped pressurized fluid, is extracted out of the inflatable cascade assembly 80 (see FIGS. 4, 9D), so that the inflatable cascade assembly 80 may be stowed back into the original compact shape package inside the nacelle 14 (see FIGS. 4, 9A).

In addition, examples of the inflatable cascade system 10 (see FIGS. 4, 9A-9D) with the inflatable cascade assembly 80 (see FIGS. 4, 9A-9D) for the cascade thrust reverser system 24 (see FIGS. 4, 9A-9D), such as the inflatable cascade thrust reverser system 24a (see FIGS. 4, 9A-9D), and the method 280 (see FIG. 12) allow for a cascade thrust reverser 176 (see FIGS. 4, 9A-9D) design with an innovative thrust reverser hardware that utilizes an inflatable cascade assembly 80 (see FIGS. 4, 9A-9D) to leverage the benefits of a shortened nacelle 14a (see FIGS. 4, 9A-9D), or compact nacelle. Such benefits include, but are not limited to, a reduced aerodynamic drag 274 (see FIG. 4), such as a reduced nacelle external drag 275 (see FIG. 4), an increased fan duct efficiency 276 (see FIG. 4), an increased fan nozzle efficiency 277 (see FIG. 4), and a reduced weight 278 (see FIG. 4) and a reduced length 279 (see FIG. 4) of the nacelle 14 (see FIG. 4). The inflatable cascade system 10 (see FIGS. 4, 9A-9D) efficiently uses the volumetric space for the thrust reverser hardware in the forward thrust nozzle configuration. The inflatable cascade hardware design enables a lightweight solution to the ultimate compact nacelle architecture.

Moreover, examples of the inflatable cascade system 10 (see FIGS. 4, 9A-9D) with the inflatable cascade assembly 80 (see FIGS. 4, 9A-9D) for the cascade thrust reverser system 24 (see FIGS. 4, 9A-9D), such as the inflatable cascade thrust reverser system 24a (see FIGS. 4, 9A-9D), and the method 280 (see FIG. 12) provide the shortened nacelle 14a (see FIGS. 4, 9A-9D), or compact nacelle, that enables favorable hard-point constraints at the translating aft cascade support ring 140 (see FIGS. 4, 9A-9D) for the external nacelle aerodynamic line 76 (see FIG. 3C) and the fan duct outer wall aerodynamic line 78 (see FIG. 3C). In contrast to the known cascade-type thrust reverser system 30 (see FIGS. 2, 3A, 3C), the inflatable cascade system 10 (see FIGS. 4, 9A-9D) with the inflatable cascade assembly 80 (see FIGS. 4, 9A-9D) enables positioning of the inflatable cascade member 82 (see FIGS. 4, 6A) in the stowed deflated state 84 (see FIG. 6A) in a compact volume, without affecting hard-point constraints to the external nacelle aerodynamic line 76 (see FIG. 3C) and the fan duct outer wall aerodynamic line 78 (see FIG. 3C). This ultimately helps to reduce the length and diameter of the nacelle 14 (see FIGS. 4, 9A-9D). With relieved hard-point constraints from the translating aft cascade support ring 140 (see FIGS. 4, 9A-9D), in contrast to the known cascade-type thrust reverser system 30 (see FIGS. 2, 3A), a reduced length translating sleeve 170a (see FIG. 4) that is much shorter may be used and designed to reduce the nacelle external drag and the aerodynamic drag of the aircraft engine.

Accordingly, without compromising performance in the deployed reverse thrust mode 186 (see FIG. 9C), the inflatable cascade system 10 (see FIGS. 4, 9A-9D) with the inflatable cascade assembly 80 (see FIGS. 4, 9A-9D) solves the problem of designing a compact thrust reverser hardware in a forward thrust mode and enables designing more efficient under-wing nacelle packages for the overall benefit of the air vehicle 12 (see FIG. 1), such as the aircraft 12a (see FIG. 1). Further with the inflatable cascade assembly 80 (see FIGS. 4, 9A) comprising the inflatable cascade member 82 (see FIGS. 4, 9A), in the stowed deflated state 84 (see FIG. 9A), the relaxed nozzle aerolines may have 0.2% to 0.4% specific fuel consumption (SFC) benefit, and the relaxed external nacelle aerolines may enable additional 0.1% to 0.15% external drag reduction. Moreover, the inflatable cascade system 10 (see FIGS. 4, 9A-9D) allows for a shortened fan duct outer wall 172b (see FIGS. 9A-9D) that may be moved radially outward to open up the duct cross-sectional area which may help to reduce the fan duct cross-section Mach number and the skin/friction drag (Mach 2 effect). This may enable an increased fan nozzle efficiency 277 (see FIG. 4), i.e. reduced specific fuel consumption (SFC).

In addition, the inflatable cascade system 10 (see FIGS. 4, 9A-9D) with the inflatable cascade assembly 80 (see FIGS. 4, 9A-9D) enables the inflatable cascade member 82 (see FIGS. 4, 6A) in the stowed deflated state 84 (see FIG. 6A) to have a stowed length 85 (see FIG. 6A) that is much shorter than a deployed length 87 (see FIG. 5A) of the inflatable cascade member 82 (see FIGS. 4, 5A) in the deployed inflated state 86 (see FIG. 5A). For example, the stowed length 85 (see FIG. 6A) may be about 15% (fifteen percent) to about 25% (twenty-five percent) of the total length of the deployed length 87 (see FIG. 5A) of the inflatable cascade member 82 (see FIGS. 5A, 6A). For commercial aircraft engines, e.g., Boeing 737, 787, 777, the length of a known solid material cascade assembly may be from about 20 (twenty) inches to about 30-35 (thirty to thirty-five) inches long. In contrast, the length of the inflatable cascade assembly 80 (see FIGS. 4, 6A) comprising the inflatable cascade member 82 (see FIGS. 4, 6A) in the stowed deflated state 84 (see FIG. 6A) may be from about 3 (three) inches to about 5 (five) inches long. With the ability of the inflatable cascade assembly 80 (see FIGS. 4, 9A-9D) to be inflated and deflated, the inflatable cascade assembly 80 (see FIGS. 4, 9A-9D) is inflatable to assimilate known solid cascades. This is accomplished by inflating the inflatable cascade assembly 80 only when required for landing and when the cascade thrust reverser 176 (see FIG. 4) is in operation, and stowing the inflatable cascade assembly 80 during regular or typical flight operation.

Further, examples of the inflatable cascade system 10 (see FIGS. 4, 9A-9D) with the inflatable cascade assembly 80 (see FIGS. 4, 9A-9D) for the cascade thrust reverser system 24 (see FIGS. 4, 9A-9D), such as the inflatable cascade thrust reverser system 24a (see FIGS. 4, 9A-9D), and the method 280 (see FIG. 12) provide for the translating aft cascade support ring 140 (see FIGS. 4, 9A-9D) as a slider-style aft cascade support ring, which can slide or rail over the translating apparatus 148 (see FIGS. 4, 9A-9D), such as the slider apparatus 148a (see FIGS. 4, 9A-9D) at the engine hinge and latch beams (not shown). This is in contrast to the known cascade-type thrust reverser system 30 (see FIGS. 2, 3A, 3C), which has a solid cascade design, where the aft cascade support ring 44 (see FIGS. 2, 3A, 3C) is fixed or immovable. For example, the known aft cascade support ring 44 (see FIGS. 2, 3A) holds the cascade assembly 42 (see FIGS. 2, 3A) in its position, remains in a fixed position, and is the constraining point to having a compact nacelle. With the translating aft cascade support ring 140 (see FIGS. 4, 9A-9D) of the inflatable cascade system 10 (see FIGS. 4, 9A-9D), the inflatable cascade assembly 80 (see FIGS. 4, 9A-9D) is translatable and is only required to be deployed for landing and when the cascade thrust reverser 176 (see FIG. 4) is in operation, and may be stowed during regular or typical flight operation, to enable reduced aerodynamic drag 274 (see FIG. 4) and increased fan nozzle efficiency 277 (see FIG. 4).

Using the translating aft cascade support ring 140 (see FIGS. 4, 9A-9D) eliminates or minimizes the hard-point constraints of the fixed aft cascade support ring 44 (see FIG. 2), and by making the translating aft cascade support ring 140 (see FIGS. 4, 9A-9D) movable along the translating apparatus 148 (see FIGS. 9A-9D), such as the slider apparatus 148a (see FIGS. 9A-9D), the known fan duct outer wall 37b (see FIGS. 9A-9D) can be shortened to the shortened fan duct outer wall 172b (see FIGS. 9A-9D), which, in turn, preferably makes the nacelle 14 (see FIGS. 9A-9D) compact during flight operation, improving the efficiency of the engine 16 (see FIGS. 9A-9D), and providing an increased fan nozzle efficiency 277 (see FIG. 4) and an increased fan duct efficiency 276 (see FIG. 4).

In addition, examples of the inflatable cascade system 10 (see FIGS. 4, 9A-9D) with the inflatable cascade assembly 80 (see FIGS. 4, 9A-9D) for the cascade thrust reverser system 24 (see FIGS. 4, 9A-9D), such as the inflatable cascade thrust reverser system 24a (see FIGS. 4, 9A-9D), and the method 280 (see FIG. 12) provide a safety feature or system with one or more safety devices 190 (see FIGS. 4, 10). The safety devices 190 (see FIG. 4) preferably comprise one or more pressure sensors 190a (see FIG. 4) configured to signal during the fully deployed position at reverse thrust stage 184 (see FIGS. 9C, 10), one or more of, an air leakage 191a (see FIG. 4) in the inflatable cascade system 10, a cascade breach 191b (see FIG. 4) of one or more of the plurality of inflatable cascade members 82 (see FIG. 4), or another safety issue. The safety devices 190 (see FIG. 4) may further comprise transducers, electrical signals, alarms, or other safety devices or safety notification devices. The one or more safety devices 190 (see FIG. 4) preferably eliminate risk due to any air leakage 191a (see FIG. 4) or cascade breach 191b (see FIG. 4) or cascade puncture. Further, to prevent deflation because of air leakage 191a (see FIG. 4) during use, multiple internal tubes, such as separate tube elements 130 (see FIG. 7A) or continuous segmented elements 134 (see FIG. 7B) may be implemented in the second inflatable flexible side 96 (see FIGS. 7A-7B) of the plurality of circumferential vanes 92 (see FIGS. 7A-7B), so that if one internal tube leaks, then the other internal tubes keep the plurality of circumferential vanes 92 inflated. In addition, a plenum chamber 136 (see FIG. 8A) comprising an orifice plate portion 138 (see FIG. 8A), may be used to evenly distribute the pressurized fluid 120 (see FIGS. 9A-9D) in the inflatable cascade assembly 80 (see FIGS. 9A-9D) and the plurality of cascade vanes 92 (see FIGS. 9A-9D). The extendable side supports 118 (see FIGS. 5C, 6C) are used to elongate the plurality of circumferential vanes 92 (see FIGS. 5C, 6C) and the plurality of inflatable support members 102 (see FIGS. 5C, 6C) in a guided, straight manner similar to a manner of an accordion.

Many modifications and other examples of the disclosure will come to mind to one skilled in the art to which this disclosure pertains having the benefit of the teachings presented in the foregoing descriptions and the associated drawings. The examples described herein are meant to be illustrative and are not intended to be limiting or exhaustive. Although specific terms are employed herein, they are used in a generic and descriptive sense only and not for purposes of limitation.

What is claimed is:

1. An inflatable cascade assembly for a cascade thrust reverser system of an engine of an air vehicle, the inflatable cascade assembly comprising:
   a plurality of inflatable cascade members configured for inflation with a pressurized fluid, the plurality of inflatable cascade members movable between a stowed deflated state and a deployed inflated state, each inflatable cascade member comprising:
      a forward end;
      an aft end;
      a body formed between the forward end and the aft end, the body comprising:
         a plurality of circumferential vanes that are spaced apart and laterally extending, each circumferential vane comprising a first non-inflatable rigid side attached adjacent to a second inflatable flexible side;
         a plurality of inflatable support members that are spaced apart and longitudinally extending, the plurality of inflatable support members being coupled in a perpendicular arrangement to the plurality of circumferential vanes; and
         a plurality of flow openings defined between the plurality of circumferential vanes and the plurality of inflatable support members;
      a first extendable side support coupled to first side ends of the body; and
      a second extendable side support coupled to second side ends of the body, the first extendable side support and the second extendable side support positioned parallel to the plurality of inflatable support members.

2. The inflatable cascade assembly of claim 1, further comprising a plenum chamber coupled at the forward end of each inflatable cascade member, to distribute the pressurized fluid uniformly within each inflatable cascade member.

3. The inflatable cascade assembly of claim 1, wherein the second inflatable flexible side of one or more of the plurality of circumferential vanes has a tube configuration comprising a plurality of separate tube elements.

4. The inflatable cascade assembly of claim 1, wherein the second inflatable flexible side of the plurality of circumferential vanes has a segmented configuration comprising a plurality of segmented elements.

5. The inflatable cascade assembly of claim 1, wherein the second inflatable flexible side of the plurality of circumferential vanes, and the plurality of inflatable support members are both made of a flexible material comprising one of, a para-aramid synthetic fiber, nylon, rubber, polyvinyl chloride, polyethylene, and polypropylene.

6. The inflatable cascade assembly of claim 1, wherein each of the plurality of inflatable cascade members has a stowed length, when in the stowed deflated state, that is about 15% (fifteen percent) to about 25% (twenty-five percent) of a deployed length of the inflatable cascade member, when in the deployed inflated state.

7. The inflatable cascade assembly of claim 1, wherein the plurality of inflatable cascade members is inflated with the pressurized fluid comprising one of, pressurized air, engine compressor bleed air, compressed air, hydraulic fluid, and ram air.

8. The inflatable cascade assembly of claim 1, wherein the forward end is configured for coupling to a forward flow valve, and the forward flow valve is configured for coupling to a pressurized fluid supply system for inflating the plurality of inflatable cascade members with the pressurized fluid.

9. The inflatable cascade assembly of claim 1, wherein the aft end is configured for coupling to a translating aft cascade support ring and to an aft flow valve, and the translating aft cascade support ring is configured for coupling to a translating apparatus configured to move the translating aft cascade support ring, which, in turn, moves the plurality of inflatable cascade members between the stowed deflated state and the deployed inflated state, to elongate and shorten the plurality of inflatable cascade members.

10. An inflatable cascade system for a cascade thrust reverser system of an engine of an air vehicle, the inflatable cascade system comprising:
 an inflatable cascade assembly coupled to a fixed portion of a nacelle of the engine, the inflatable cascade assembly comprising a plurality of inflatable cascade members movable between a stowed deflated state, when the cascade thrust reverser system is in a stowed forward thrust mode, and a deployed inflated state, when the cascade thrust reverser system is in a deployed reverse thrust mode, each inflatable cascade member comprising a forward end, an aft end, and a body formed between the forward end and the aft end;
 a forward flow valve coupled to the forward end;
 a pressurized fluid supply system coupled to the forward flow valve, the pressurized fluid supply system providing pressurized fluid to the plurality of inflatable cascade members, via the forward flow valve, to inflate the plurality of inflatable cascade members;
 a translating aft cascade support ring coupled at the aft end; and
 an aft flow valve coupled to the aft end.

11. The inflatable cascade system of claim 10, wherein the body of each inflatable cascade member comprises:
 a plurality of circumferential vanes that are spaced apart and laterally extending, each circumferential vane comprising a first non-inflatable rigid side attached adjacent to a second inflatable flexible side;
 a plurality of inflatable support members that are spaced apart and longitudinally extending, the plurality of inflatable support members being coupled in a perpendicular arrangement to the plurality of circumferential vanes; and
 a plurality of flow openings defined between the plurality of circumferential vanes and the plurality of inflatable support members.

12. The inflatable cascade system of claim 11, wherein each inflatable cascade member further comprises: a first extendable side support coupled to first side ends of the body; and a second extendable side support coupled to second side ends of the body, the first extendable side support and the second extendable side support positioned parallel to the plurality of inflatable support members.

13. The inflatable cascade system of claim 10, wherein the inflatable cascade assembly further comprises a plenum chamber coupled at the forward end of each inflatable cascade member, to distribute the pressurized fluid uniformly within each inflatable cascade member.

14. The inflatable cascade system of claim 10, further comprising one or more safety devices comprising one or more pressure sensors configured to signal one or more of, an air leakage in the inflatable cascade system, and a cascade breach of one or more of the plurality of inflatable cascade members.

15. A method of using an inflatable cascade system for a cascade thrust reverser system in an engine of an air vehicle, to provide a reduced aerodynamic drag of the engine, and to provide an increased fan nozzle efficiency of the engine, the steps of the method comprising:
 installing the inflatable cascade system for the cascade thrust reverser system, in the engine of the air vehicle, the inflatable cascade system comprising:
  an inflatable cascade assembly coupled to a fixed portion of a nacelle of the engine, the inflatable cascade assembly comprising a plurality of inflatable cascade members movable between a stowed deflated state, when the cascade thrust reverser system is in a stowed forward thrust mode, and a deployed inflated state, when the cascade thrust reverser system is in a deployed reverse thrust mode, each inflatable cascade member comprising a forward end, an aft end, and a body formed between the forward end and the aft end;
  a forward flow valve coupled to the forward end;
  a pressurized fluid supply system coupled to the forward flow valve, the pressurized fluid supply system having a pressurized fluid;
  a translating aft cascade support ring coupled at the aft end; and
  an aft flow valve coupled to the aft end,
  wherein the inflatable cascade system provides the reduced aerodynamic drag of the engine, and provides the increased fan nozzle efficiency of the engine;
 upon landing of the air vehicle, concurrently deploying from the stowed forward thrust mode, the translating aft cascade support ring, and a reduced length translating sleeve and one or more blocker doors, of the cascade thrust reverser system;
 opening the forward flow valve, and fully inflating the plurality of inflatable cascade members with the pressurized fluid from the pressurized fluid supply system, to form a trapped fluid in the plurality of inflatable cascade members, and to move the plurality of inflatable cascade members from the stowed deflated state to the deployed inflated state;
 redirecting a fan air flow with the fully inflated plurality of inflatable cascade members and with the one or more deployed blocker doors, to generate the deployed reverse thrust mode of the cascade thrust reverser system;
 closing the forward flow valve, and opening the aft flow valve to release the trapped fluid from the fully inflated plurality of inflatable cascade members, out through one or more pressure relief vents in the reduced length translating sleeve, and to move the plurality of inflatable cascade members from the deployed inflated state back to the stowed deflated state; and
 moving concurrently the translating aft cascade support ring, and the reduced length translating sleeve and the one or more blocker doors, from the deployed reverse thrust mode back to the stowed forward thrust mode, and closing the aft flow valve.

16. The method of claim 15, wherein installing the inflatable cascade system in the engine of the air vehicle further comprises installing the inflatable cascade assembly further comprising a plenum chamber coupled at the forward end of each inflatable cascade member, to distribute the pressurized fluid uniformly within each inflatable cascade member.

17. The method of claim 15, wherein installing the inflatable cascade system in the engine of the air vehicle further comprises installing one or more safety devices comprising one or more pressure sensors configured to signal one or more of, an air leakage in the inflatable cascade system, and a cascade breach of one or more of the plurality of inflatable cascade members.

18. The method of claim 15, wherein installing the inflatable cascade system in the engine of the air vehicle further comprises installing the inflatable cascade assembly, wherein the translating aft cascade support ring is coupled to a translating apparatus configured to move the translating aft cascade support ring, which, in turn, moves the plurality of inflatable cascade members between the stowed deflated state and the deployed inflated state, to elongate and shorten the plurality of inflatable cascade members.

19. The method of claim 15, wherein installing the inflatable cascade system in the engine of the air vehicle further comprises installing the inflatable cascade assembly, wherein each of the plurality of inflatable cascade members has a stowed length, when in the stowed deflated state, that is about 15% (fifteen percent) to about 25% (twenty-five percent) of a deployed length of the inflatable cascade member, when in the deployed inflated state.

20. The method of claim 15, wherein opening the forward flow valve and fully inflating the plurality of inflatable cascade members with the pressurized fluid from the pressurized fluid supply system, comprises fully inflating the plurality of inflatable cascade members with the pressurized fluid comprising one of, pressurized air, engine compressor bleed air, compressed air, hydraulic fluid, and ram air.

* * * * *